(12) United States Patent
Gupta et al.

(10) Patent No.: US 12,249,021 B2
(45) Date of Patent: Mar. 11, 2025

(54) ACCELERATED BOUNDING VOLUME HIERARCHY (BVH) TRAVERSAL FOR RAY TRACING

(71) Applicant: QUALCOMM Incorporated, San Diego, CA (US)

(72) Inventors: Piyush Gupta, Bangalore (IN); Pavan Kumar Akkaraju, Bangalore (IN); Alexei Vladimirovich Bourd, San Diego, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 17/934,869

(22) Filed: Sep. 23, 2022

(65) Prior Publication Data

US 2024/0104824 A1 Mar. 28, 2024

(51) Int. Cl.
*G06T 15/06* (2011.01)
*G06T 17/00* (2006.01)
*G06T 17/10* (2006.01)

(52) U.S. Cl.
CPC ............ *G06T 15/06* (2013.01); *G06T 17/005* (2013.01); *G06T 17/10* (2013.01)

(58) Field of Classification Search
None
See application file for complete search history.

(56) References Cited

U.S. PATENT DOCUMENTS

| 2017/0221177 | A1* | 8/2017 | Worcester | G06T 11/40 |
| 2021/0390758 | A1 | 12/2021 | Muthler et al. | |
| 2022/0254088 | A1* | 8/2022 | Broome | G09G 5/363 |
| 2023/0298127 | A1* | 9/2023 | Barczak | G06T 1/60 |
| | | | | 345/531 |

OTHER PUBLICATIONS

Daniel M., et al., "A Survey on Bounding Volume Hierarchies for Ray Tracing", Computer Graphics Forum: Journal of the European Association for Computer Graphics, Wiley-blackwell, Oxford, vol. 40, No. 2, Jun. 4, 2021, pp. 683-712, XP071554288, ISSN: 0167-7055, DOI: 10.1111/CGF.142662, section 6.1.2.

(Continued)

*Primary Examiner* — Nurun Flora
(74) *Attorney, Agent, or Firm* — Polsinelli

(57) ABSTRACT

Systems and techniques are provided for accelerated ray tracing. For instance, a process can include obtaining a hierarchical acceleration data structure that includes a plurality of primitives of a scene object and obtaining a respective information value associated with each primitive included in the plurality of primitives. A sort order can be determined for two or more nodes included in a same level of the hierarchical acceleration data structure at least in part by sorting the two or more nodes based on a respective sorting parameter value determined for each respective node of the two or more nodes. Each respective sorting parameter value can be determined based on at least one information value associated with one or more primitives included in a sub-tree of each respective node of the two or more nodes. The hierarchical acceleration data structure can be traversed using the sort order.

27 Claims, 12 Drawing Sheets

(56) References Cited

OTHER PUBLICATIONS

International Search Report and Written Opinion—PCT/US2023/073518—ISA/EPO—Jan. 8, 2024.
Ize T., et al., "RTSAH Traversal Order for Occlusion Rays", Computer Graphics Forum: Journal of the European Association for Computer Graphics, Wiley-blackwell, Oxford, vol. 30, No. 2, Apr. 28, 2011, pp. 297-305, XP071551996, ISSN: 0167-7055, DOI: 10.1111/J.1467-8659.2011.01861.X, section 1, 2.1, 3, 4.1.
Nah J-H., et al., "SATO: Surface Area Traversal Order for Shadow Ray Tracing", Computer Graphics Forum: Journal of the European Association for Computer Graphics, Wiley-blackwell, Oxford, vol. 33, No. 6, Mar. 14, 2014, pp. 167-177, XP071544688, ISSN: 0167-7055, DOI: 10.1111/CGF.12341, abstract, sections 3, 3.2, 3.3.
Nah J-H., et al., "T&I Engine: Traversal and Intersection Engine for Hardware Accelerated Ray Tracing", Computers and Accessibility, ACM, 2 Penn Plaza, Suite 701 New York, 10121-0701 USA, vol. 30, No. 6, Dec. 12, 2011, 10 Pages, XP058499538, DOI: 10.1145/2024156.2024194, ISBN: 978-1-4503-0920-2, abstract, p. 1-p. 3.
Ogaki S., et al., "An N-ary BVH Child Node Sorting Technique for Occlusion Tests", Journal of Computer Graphics Techniques, vol. 5, No. 2, Jan. 1, 2016, pp. 22-37, XP093081715, ISSN: 2331-7418, sections 1, 2, 3,3.2, 4, 4.2, 4.3, A.

\* cited by examiner

800

Obtain A Hierarchical Acceleration Data Structure, The Hierarchical Acceleration Data Structure Including A Plurality Of Primitives Of A Scene Object
802

Obtain A Respective Information Value Associated With Each Primitive Included In The Plurality Of Primitives
804

Determine A Sort Order For Two Or More Nodes At Least In Part By Sorting The Two Or More Nodes Included In A Same Level Of The Hierarchical Acceleration Data Structure Based On A Respective Sorting Parameter Value Determined For Each Respective Node Of The Two Or More Nodes, Wherein Each Respective Sorting Parameter Value Is Based On At Least One Information Value Associated With One Or More Primitives Included In A Sub-Tree Of Each Respective Node Of The Two Or More Nodes
806

Traverse The Hierarchical Acceleration Data Structure Using The Sort Order
808

FIG. 8

ACCELERATED BOUNDING VOLUME HIERARCHY (BVH) TRAVERSAL FOR RAY TRACING

FIELD

The present disclosure generally relates to graphics processing. For example, aspects of the present disclosure are related to systems and techniques for accelerating the traversal of a hierarchical acceleration data structure for ray tracing.

BACKGROUND

Ray tracing is a computer graphics technique that can be used to generate images by tracing paths of light through a three-dimensional scene, simulating interactions with objects illuminated by light sources, and determining ray intersections. Ray intersections can include ray-primitive intersections or ray-object intersections. Primitives are geometric shapes that can be used to construct or model larger three-dimensional objects. For example, primitives can include triangles or polygons.

Ray tracing can be used to generate realistic images, including shadows, of a three-dimensional scene. Scene geometry can be stored in an acceleration data structure that groups scene primitives. An acceleration data structure can be used to accelerate the process of ray tracing by improving the efficiency of ray intersection tests and/or calculations. For example, a bounding volume hierarchy (BVH) is an acceleration data structure that can group scene primitives in a hierarchical tree of bounding volumes enclosing one or more of the scene primitives. Ray tracing can be performed by traversing these hierarchies to determine ray-primitive and/or ray-object intersections.

BRIEF SUMMARY

In some examples, systems and techniques are described for accelerating the traversal of a hierarchical acceleration data structure for ray tracing. For example, the systems and techniques can be used to provide accelerated ray traversal for traversing a bounding volume hierarchy (BVH) based on obtaining one or more information values associated with each primitive of a plurality of primitives included in the BVH. In some examples, the systems and techniques can be used to provide accelerated ray traversal (e.g., for traversing a BVH) for primary rays, shadow rays, reflection rays, and/or refraction rays. According to at least one illustrative example, a method is provided for ray tracing, the method including: obtaining a hierarchical acceleration data structure, the hierarchical acceleration data structure including a plurality of primitives of a scene object; obtaining a respective information value associated with each primitive included in the plurality of primitives; determining a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes; and traversing the hierarchical acceleration data structure using the sort order.

In another example, an apparatus for ray tracing is provided that includes a memory (e.g., configured to store data, such as graphics data, one or more images, etc.) and one or more processors (e.g., implemented in circuitry) coupled to the memory. The one or more processors are configured to and can: obtain a hierarchical acceleration data structure, the hierarchical acceleration data structure including a plurality of primitives of a scene object; obtain a respective information value associated with each primitive included in the plurality of primitives; determine a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes; and traverse the hierarchical acceleration data structure using the sort order.

In another example, a non-transitory computer-readable medium is provided that has stored thereon instructions that, when executed by one or more processors, cause the one or more processors to: obtain a hierarchical acceleration data structure, the hierarchical acceleration data structure including a plurality of primitives of a scene object; obtain a respective information value associated with each primitive included in the plurality of primitives; determine a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes; and traverse the hierarchical acceleration data structure using the sort order.

In another example, an apparatus for ray tracing is provided. The apparatus includes: means for obtaining a hierarchical acceleration data structure, the hierarchical acceleration data structure including a plurality of primitives of a scene object; means for obtaining a respective information value associated with each primitive included in the plurality of primitives; means for determining a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes; and means for traversing the hierarchical acceleration data structure using the sort order.

In some aspects, one or more of the apparatuses described above is or is part of a camera, a mobile device (e.g., a mobile telephone or so-called "smart phone" or other mobile device), a vehicle or computing system or device of a vehicle, a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 8 is a flow diagram illustrating an example of a process for graphics processing, in accordance with some examples of the present disclosure.

DETAILED DESCRIPTION

Figure 1A:
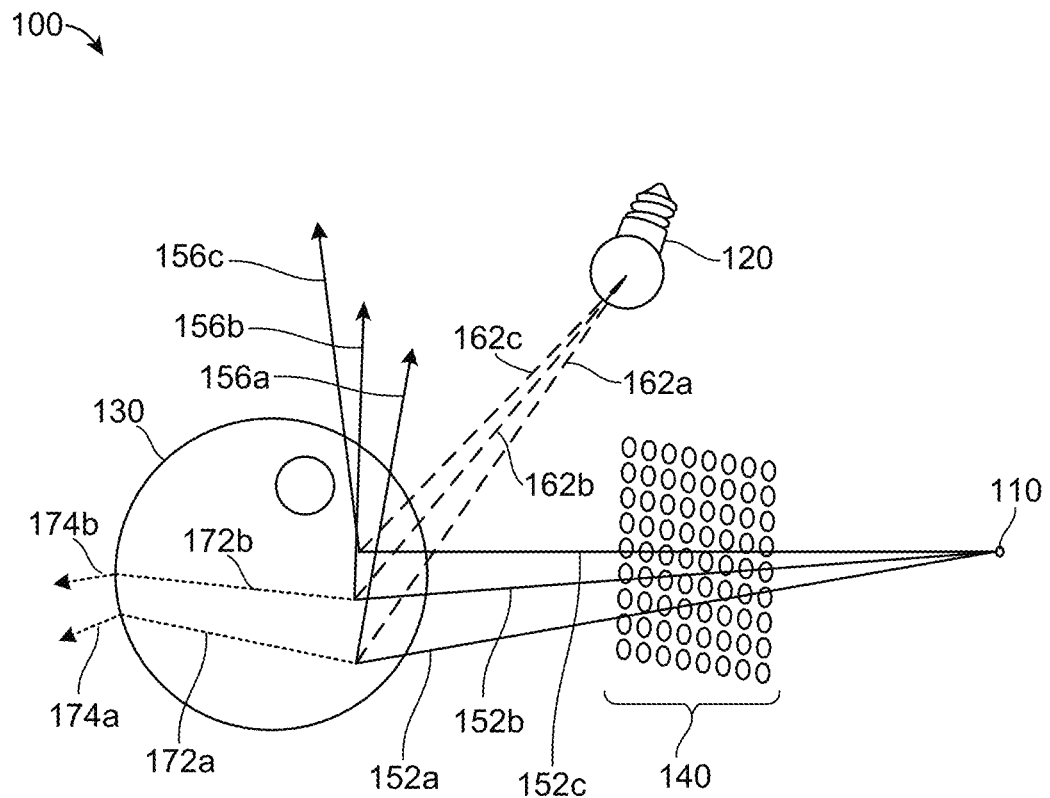
FIG. 1A illustrates an example of a ray tracing process, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Ray tracing is a graphics processing and rendering technique that can be used to produce photorealistic images by modeling light transport to simulate optical effects. Ray tracing can realistically simulate the lighting of a three-dimensional (3D) scene and its objects by rendering physically correct reflections, refractions, shadows, and/or indirect lighting in the two-dimensional (2D) view of the scene.

Ray tracing can be a computationally intensive technique. For example, the computational resources (e.g., compute time) used to ray trace a single frame can increase with the number of rays that are traced per frame and/or can increase with the computational resources (e.g., compute time) expended to trace each individual ray. Due to this computational complexity, ray tracing may often be limited to non-real time uses. Real-time ray tracing has long been sought after for uses such as rendering video games, virtual reality (VR) and augmented reality (AR) experiences, etc. Real-time ray tracing has recently become possible, using, for example, hardware acceleration units and/or graphics processing units (GPUs) that can provide parallelization of the underlying calculations for each individual ray that is projected into a scene.

The number of rays that can be projected into a scene for each frame is often relatively small, as the rendering time per frame cannot exceed some maximum amount without losing real-time performance. The image quality when using real-time ray tracing can be improved by increasing the number of rays projected into the scene per frame. For example, the number of rays projected into the scene per frame can be increased by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance (e.g., image quality) of existing ray tracing hardware is desirable.

Systems, apparatuses, processes (also referred to as methods), and computer readable media (collectively referred to as "systems and techniques") are described herein that can provide accelerated ray tracing operations for one or more rays. For example, as described in more detail herein, the systems and techniques can increase a number of rays projected into a scene per frame by tracing each ray more efficiently (e.g., reducing the compute time per ray trace operation allows more ray trace operations to be performed in the same fixed rendering time per frame). For example, the systems and techniques can increase a number of rays projected into a scene per frame based on more efficiently traversing a hierarchical acceleration data structure (e.g., bounding volume hierarchy (BVH)) associated with the scene. In some examples, the systems and techniques can perform accelerated hierarchical acceleration data structure (e.g., BVH) based on sorting the hierarchical acceleration data structure using one or more information values associated with each primitive of a plurality of primitives included in the hierarchical acceleration data structure. The one or more rays may include primary rays, shadow rays, reflection rays, and/or refraction rays. In some examples, the systems and techniques can provide accelerated ray tracing operations that are accelerated based on a type of hierarchical structure being traversed for ray intersection testing, based on a type of ray being tested for intersection against the hierarchical structure, and/or based on a combination of the two.

Various aspects of the application will be described with respect to the figures.

FIG. 1A is a diagram illustrating an example of a ray tracing technique 100. As illustrated, a ray tracing system can perform ray tracing by casting a plurality of rays (e.g., ray 152a, ray 152b, and ray 152c) from a virtual or imaginary view camera 110 (e.g., which determines the view into the 3D scene), through the pixels 140 of a 2D viewing plane, out into the 3D scene. In some examples, the rays 152a-c may also be referred to as "primary rays." Each primary ray can pass through a particular one of the pixels 140 (e.g., as illustrated in FIG. 1A). In some cases, each primary ray can pass through a different one of the pixels 140 when rendering a 3D scene. Multiple rays may also be used for some (or all) of the pixels 140. After casting one or more of the primary rays 152a-c, a ray tracing system can then trace the path of each primary ray to determine if the ray reaches back to a light source 120 in the 3D scene. Multiple different primary rays can be processed in parallel (e.g., because primary rays interact with various objects, surfaces, light sources, etc., in the 3D scene, but do not interact with other primary rays).

In the example of ray tracing technique 100, each primary ray 152a-c originates from the virtual or imaginary view camera 110 (e.g., sharing a common origin) and is projected through a particular pixel of the plurality of pixels 140 that are located on the 2D viewing plane (e.g., as described above). In the event a particular one of the primary rays 152a-c reaches a light source (e.g., light source 120) in the 3D scene, then information from that ray may be used to contribute to the final color and/or illumination level of the pixel (e.g., from the pixels 140) through which the particular ray was projected.

For example, when rays projected into the scene intersect with one or more objects (e.g., such as object 130), color and lighting information from the point(s) of intersection on the object(s) surfaces can contribute to the final colors and illumination levels of the pixels (e.g., pixels 140) associated with the rays (e.g., primary rays 152a-c). The color and lighting information can be determined based on whether the ray-object intersection point is directly illuminated by a light source (e.g., light source 120) or occluded (e.g., shadowed). Color and lighting information for a ray-object intersection point can be determined by projecting one or more shadow rays from the ray-object intersection point to the light sources within the scene, as will be described in greater depth below. If a shadow ray does not intersect an object on its way to the light source, then the ray-object intersection (e.g., also referred to as a "hit point") is illuminated. If the shadow ray does intersect with another object, then the hit point may be occluded (e.g., the object intersected by the shadow ray can cast a shadow on the hit point). Similarly, different objects can have different surface properties that reflect, refract, and/or absorb light in different ways, which can also contribute to the final pixel colors and/or illumination level. For example, color and lighting information for a ray-object intersection point can additionally, or alternatively, be determined based on projecting one or more reflection rays away from a surface upon which the ray-object intersection is located. Rays can also reflect off of objects and hit other objects in the scene, or travel through the surfaces of transparent objects, etc., before reaching a light source (e.g., light source 120). In some examples, color and lighting information for a ray-object intersection point can additionally, or alternatively, be determined based on projecting one or more refraction rays through the surface upon which the ray-object intersection is located.

For example, as illustrated in FIG. 1A, a first primary ray 152a is projected into the scene and intersects object 130, resulting in the generation of a first shadow ray 162a. First shadow ray 162a is projected between the hit point (e.g., where first primary ray 152a intersects object 130) and light source 120, and may be used to determine whether the hit point between first primary ray 152a and object 130 is directly illuminated by light source 120 or shadowed by an additional scene object. As illustrated, first shadow ray 162a reaches light source 120 and consequently, can contribute color or illumination information for rendering the particular one of the pixels 140 through which first primary ray 152 was projected. The intersection (e.g., hit point) between first primary ray 152a and object 130 may also be used to generate one or more reflection rays, such as the first reflection ray 156a depicted in FIG. 1A. First reflection ray 156a does not reach light source 120, and consequently, may not directly contribute color or illumination information back to the pixels 140. In some cases, first reflection ray 156a may intersect with additional scene objects (not shown) and can contribute color and/or illumination information for these additional intersection points between the reflection ray and one or more additional scene objects.

The intersection (e.g., hit point) between first primary ray 152a and object 130 may also be used to generate one or more refraction rays, such as the first refraction rays 172a and 174a, illustrated in FIG. 1A. First refraction ray 152 is transmitted from the hit point on the surface of object 130 and through the inner or enclosed volume of object 130. First refraction ray 172a can be associated with a refraction angle (e.g., relative to the angle of incidence of the primary ray 152a with respect to surface 130) from entering object 130. In some cases, the refraction angle and/or an attenuation of first refraction ray 172a while interacting with object 130 can be based on one or more material properties of object 130. An additional first refraction ray 174a can be generated at the intersection (e.g., hit point) between first refraction ray 172a and the surface of object 130 through which first refraction ray 172a exits. A similar example is depicted with respect to second refraction rays 172b and 174b, which may be generated based on the intersection (e.g., hit point) between second primary ray 152b and the surface of object 130. When a refraction ray reaches a light source in the scene (e.g., light source 120), the refraction ray can contribute color or illumination information for rendering a particular one of the pixels 140. If a refraction ray does not reach a light source in the scene, then in some cases the refraction ray may not contribute color or illumination information for rendering the pixels 140.

A same or similar scenario is illustrated for second primary ray 152b and the associated second shadow ray 162b (e.g., which reaches light source 120) and second reflection ray 156*b* (e.g., which does not reach light source 120), as well as for third primary ray 152*c* and the associated third shadow ray 162*c* (e.g., which reaches light source 120) and third reflection ray 156*c* (e.g., which does not reach light source 120).

Figure 1B:
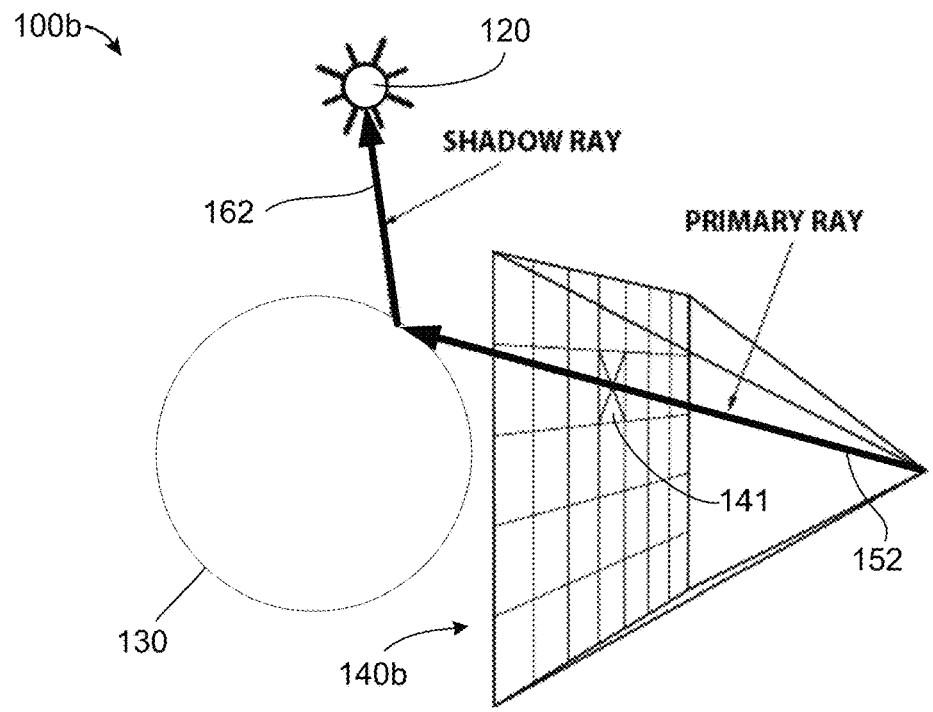
FIG. 1B illustrates an example of a ray tracing process including one or more shadow rays, in accordance with some examples.

FIG. 1B is a diagram illustrating another example of a ray tracing process 100*b*. Here, a primary ray 152 is projected through a grid of pixels 140*b* and into a scene that includes object 130. For example, primary ray 152 is projected from an origin/viewpoint, through a particular pixel 141 (e.g., included in the grid of pixels 140*b*), and intersects with object 130. The hit point or ray-object intersection between primary ray 152 and object 130 is then used as the origin for generating and projecting a shadow ray 162. As described above, shadow ray 162 can be projected from the hit point to the light source 120. As depicted in FIG. 1B, shadow ray 162 reaches light source 120 without intersecting any other object or scene primitive, and lighting and color information can be determined for pixel 141 based on the hit point being directly illuminated by light source 120.

Figure 1C:
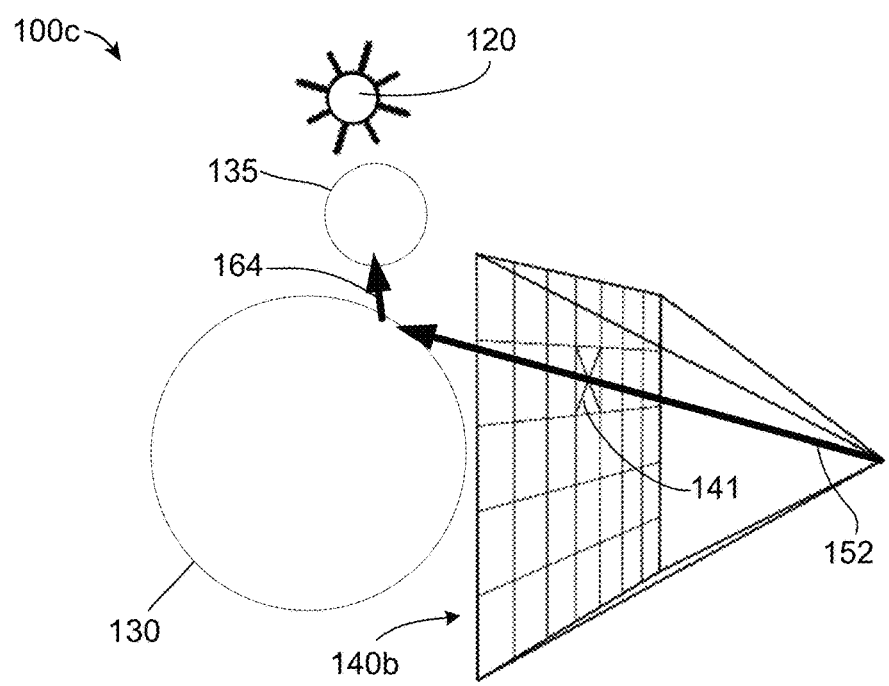
FIG. 1C illustrates an example of a ray tracing process including one or more occluded shadow rays, in accordance with some examples.

FIG. 1C is a diagram illustrating another example of a ray tracing process 100*c*. The diagram of FIG. 1C is the same as that of FIG. 1B, with the addition of an additional object 135 (e.g., an additional scene primitive) that lies along the direct path between the hit point (e.g., where primary ray 152 and object 130 intersect) and the light source 120. Here, when a shadow ray 164 is generated and projected from the hit point to the light source 120, shadow ray 164 intersects with additional object 135 and does not reach light source 120. Because shadow ray 164 does not reach light source 120, the hit point may be considered occluded or shadowed by the additional object 135. For example, based on the intersection between shadow ray 164 and additional object 135, lighting and color information can be determined for pixel 141 based on the hit point being occluded or shadowed (e.g., occluded or shadowed with respect to the light source 120). In some examples, after generating and projecting a shadow ray in response to determining a hit point between a primary ray and a scene object/primitive, processing for the shadow ray can be terminated when the shadow ray intersects with the light source or another scene primitive (e.g., whichever comes first).

As mentioned previously, each interaction between a ray and an object (e.g., scene object, primitive, surface within the 3D scene, etc.) can contribute color and/or illumination information back to the particular pixel through which a primary ray was projected. In some cases, tracing a greater number of interactions per ray can provide increased visual fidelity (e.g., quality) of the rendered scene at the expense of increased computational cost (e.g., time). For example, a ray tracing approach that prioritizes speed over quality might calculate or otherwise determine only the first reflection for each ray, while a ray tracing approach that prioritizes quality over speed might determine three or more reflections per ray. In some cases, after observing either a maximum number of reflections or a ray traveling a certain distance without intersection, the ray can cease to travel and the pixel's value can be updated. In some cases, the ray can cease to travel and the pixel's value can be updated based on a ray traveling a certain distance without reflection (e.g., reflection being one possible outcome of an intersection). In some cases, the number of rays that are projected through each pixel of the 2D viewing plane can be adjusted based on a similar tradeoff between computational cost and visual fidelity.

Ray tracing can therefore become very costly in terms of the time and/or computational power that is required to render realistic-looking scenes, based, for example, on the number of rays projected into the scene and the number of additional rays that are traced for secondary reflections and refractions. Due to this computational complexity, ray tracing is typically limited to non-real time uses (e.g., scenes or visual effects that could be rendered in advance for film and television). Real-time ray tracing has long been sought after for use cases such as rendering video games, virtual reality (VR) and augmented reality (AR) experiences, etc.

Real-time ray tracing has recently become possible and is often performed by hardware acceleration units and/or graphics processing units (GPUs) that can provide parallelization of the underlying calculations for each individual ray that is projected into the scene. The number of rays that can be projected into the scene for each frame is often relatively small, as the rendering time per frame cannot exceed some maximum amount without losing real-time performance.

The image quality when using real-time ray tracing can be improved by increasing the number of rays projected into the scene per frame. This can be achieved by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance of existing ray tracing hardware is desirable. For example, the number of rays projected into the scene per frame can also be increased by tracing each ray more efficiently (e.g., reducing the compute time per ray trace operation allows more ray trace operations to be performed in the same fixed rendering time per frame).

One example of a ray tracing acceleration technique utilizes tree-based acceleration structures to improve the efficiency of ray intersection tests (e.g., also referred to as "collision tests" and/or "hit tests") and/or other ray tracing operations. For example, a ray intersection test can include, but is not limited to, determining whether a primary ray intersects with one or more scene objects or primitives (e.g., after the primary ray is projected into the scene); determining whether a shadow ray intersects with an additional scene object or primitive (e.g., after the shadow ray is projected from a primary ray hit point to a light source); determining whether a reflection ray intersects with an additional scene object or primitive (e.g., after the reflection ray is projected from a hit point, using a calculated reflection angle); and/or determining whether a refraction ray intersects with an additional scene object or primitive (e.g., after the refraction ray is projected through the surface of a hit point, using a calculated refraction angle).

Figure 2A:
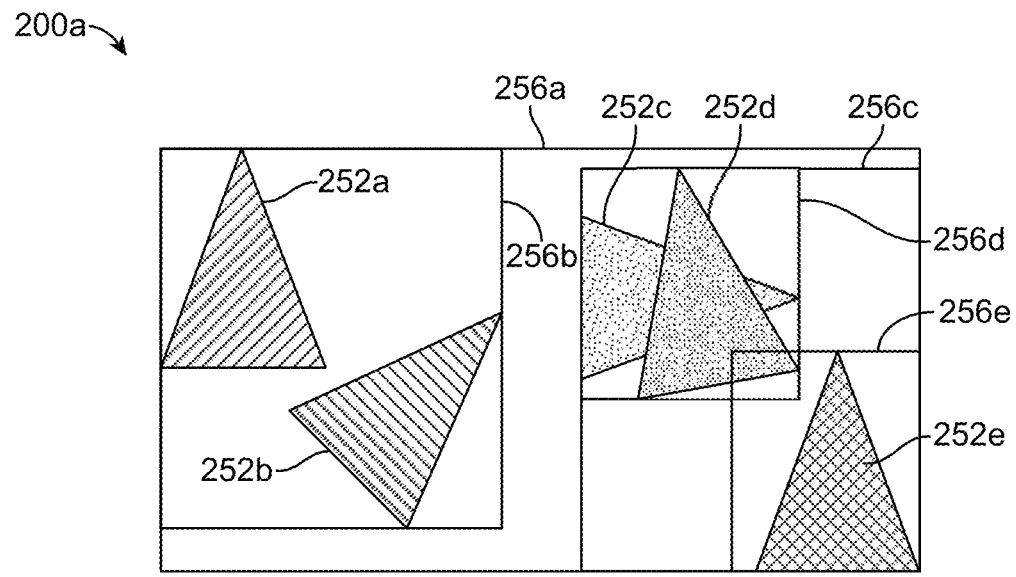
FIG. 2A illustrates an example of bounding volumes including one or more primitives representing portions of surfaces in a scene, in accordance with some examples.
Figure 2B:
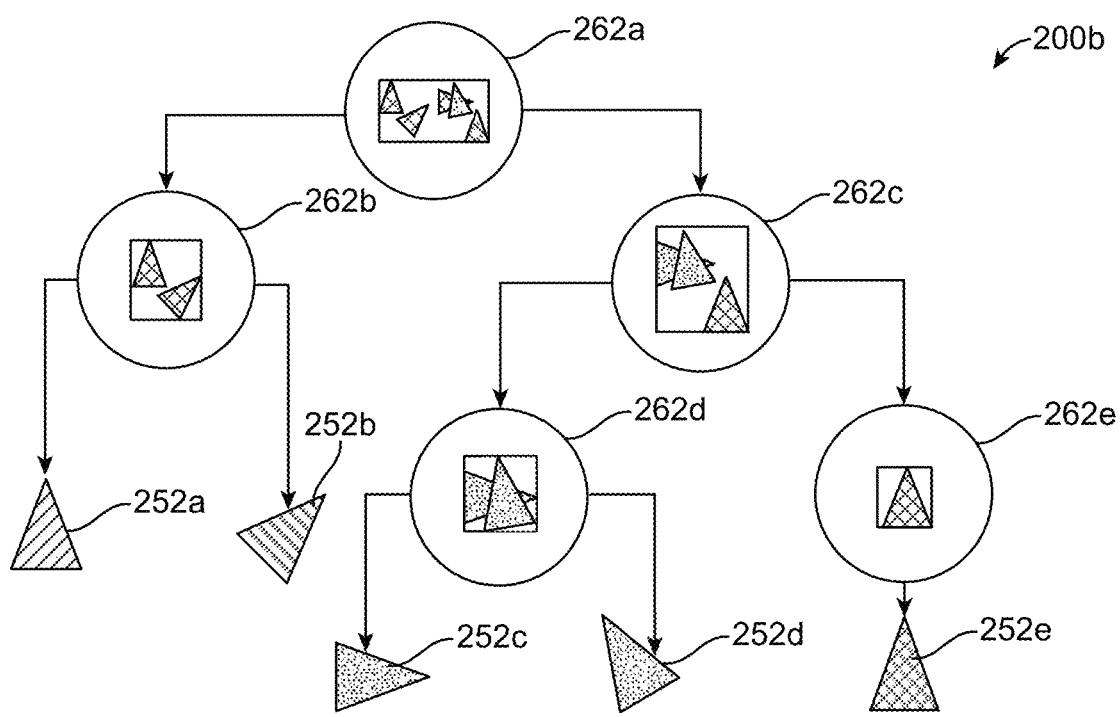
FIG. 2B illustrates an example of a bounding volume hierarchy (BVH) organizing the bounding volumes of FIG. 2A, in accordance with some examples.

Scenes can be converted into bounding volume hierarchies (BVHs), which are hierarchical tree structures composed of ever-tighter bounding volumes (also referred to as "bounding regions" such as bounding boxes or "axis-aligned bounding boxes" (AABBs)). For example, FIG. 2A illustrates an example in which a scene 200*a* containing a plurality of triangle primitives 252*a*-252*e* is arranged into a series of ever-tighter bounding boxes 256*a*-256*e*. Scenes may contain hundreds, thousands, or more primitives, but for purposes of clarity, only the five triangle primitives 252*a*-252*e* are depicted. The bounding boxes 256*a*-256*e* can be AABBs, which are bounding boxes having a minimized area or volume within which all points of the enclosed primitives (e.g., triangle primitives 252*a*-252*e*) may lie. The bounding boxes may be axis-aligned such that the edges of each bounding box 256*a*-256*e* are parallel to a coordinate axis (e.g., the x, y, and z axes). FIG. 2B illustrates an example hierarchical data structure 200b having nodes that are associated with the bounding boxes 256a-256e and triangle primitives 252a-252e shown in FIG. 2A. The hierarchical data structure 200b can be a BVH. For example, a BVH root node 262a can correspond to the bounding box 256a shown in FIG. 2A; similarly, an intermediate BVH node 262b can correspond to the bounding box 256b of FIG. 2A; intermediate BVH node 262c can correspond to the bounding box 256c of FIG. 2A, and so on.

A BVH root node (e.g., BVH root node 262a of FIG. 2B) contains an AABB (e.g., bounding box 256a of FIG. 2A) enclosing all the individual scene or object geometry contained in the BVH leaf nodes. Each primitive in the BVH root node is assigned to either the left or right child node. The child nodes contain the AABBs containing their assigned geometry, and this geometry is likewise assigned to left or right child nodes, recursively until the BVH leaf nodes contain a small number of primitives, e.g., four or fewer. Depending on the extent of any scene changes and/or object deformations, the next and any subsequent frames may require one or more new BVH build operations or BVH refitting/update operations based on the scene changes.

As mentioned previously, testing each ray for intersection against every primitive in the scene can be inefficient and computationally expensive. BVHs can be used to accelerate ray intersection testing techniques, among other ray tracing operations. For example, BVHs can be used for efficient traversal during the processing of collision checks associated with primary rays, shadow rays, reflection rays, refraction rays, etc. Each ray can be tested for intersection against BVH bounding boxes (e.g., using a depth-first tree traversal process, such as a depth-first search (DFS) traversal, etc.) instead of being tested against every primitive in the scene. As mentioned previously, bounding boxes encompass or surround different amounts of scene geometry or primitives and become increasingly tighter with the depth of the BVH tree structure.

Figure 3A:
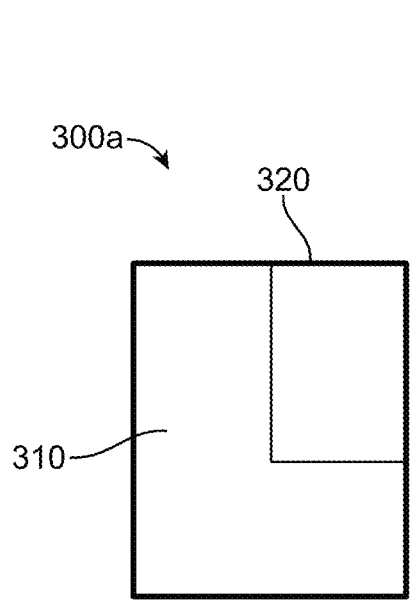
FIG. 3A illustrates an example of a scene object and an object-space bounding volume enclosing the scene object, in accordance with some examples.
Figure 3B:
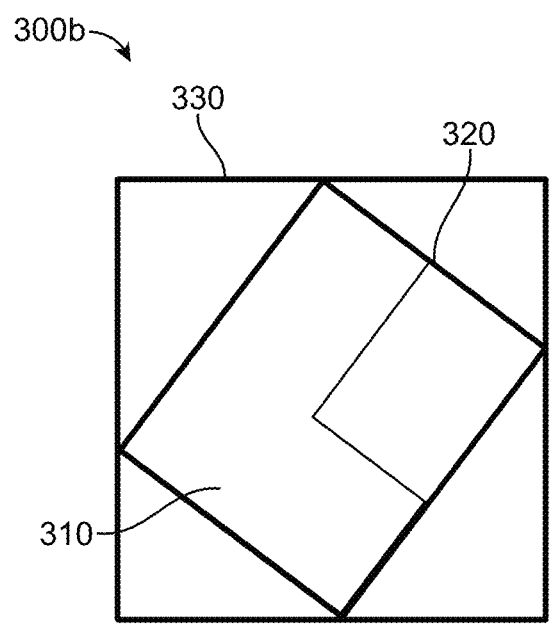
FIG. 3B illustrates an example of a world-space bounding volume enclosing the object-space bounding volume and scene object of FIG. 3A, in accordance with some examples.

Bounding boxes (e.g., AABBs or other bounding boxes) or other bounding regions can be defined with respect to world-space or object-space. World-space can be considered a constant (e.g., the coordinate space of the overall 3D scene). Objects can exist in their own coordinate space, which is referred to as object-space (e.g., the coordinate space in which the object was modeled or created). For example, FIGS. 3A and 3B are diagrams depicting object-space and world-space AABBs (axis-aligned bounding boxes) for the same geometry. Here, FIG. 3A illustrates an object-space AABB 320 of a geometric scene object 310. Scene objects can include the 3D or graphical objects that are present in a 3D scene for which ray tracing is performed. In some cases, geometric scene objects can be scene objects that include geometric primitives such as triangles. In some examples, scene objects can include AABBs or other object representations. Object-space AABB 320 and scene object 310 are both shown in the object-space 300a of the scene object 310. FIG. 3B illustrates the same geometric scene object 310 but transformed into the world-space 300b of the scene (e.g., the scene to which scene object 310 belongs or is located). A world-space AABB 330 encloses both the object-space AABB 320 and the scene object 310.

Figure 4A:
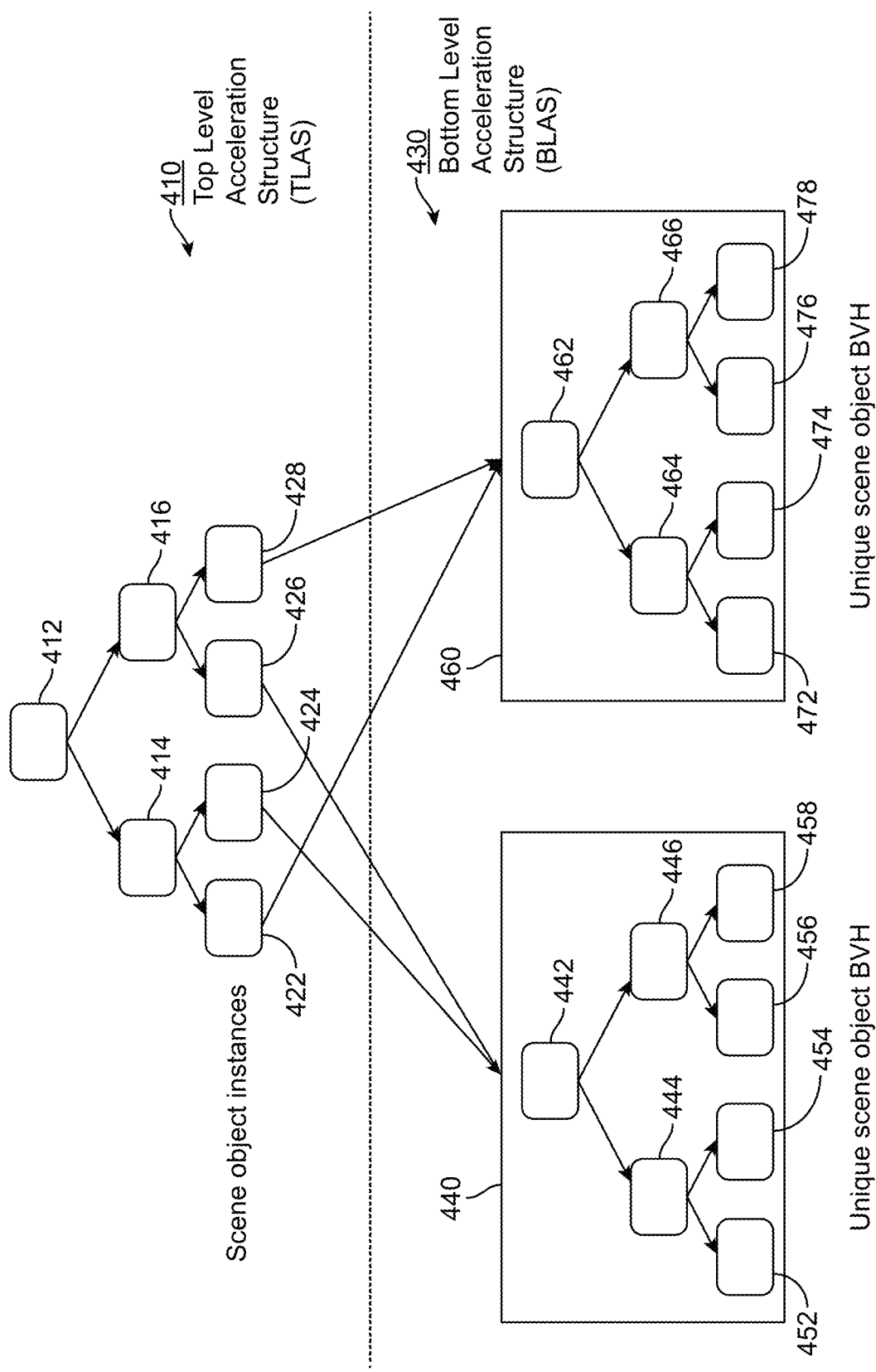
FIG. 4A illustrates an example of an acceleration data structure including a top-level acceleration structure (TLAS) and a bottom-level acceleration structure (BLAS), in accordance with some examples.

Ray tracing can utilize a two-level acceleration structure system, such as a top-level acceleration structure (TLAS) and a bottom-level acceleration structure (BLAS), as depicted in FIG. 4A. For example, FIG. 4A illustrates a TLAS 410 and a BLAS 430, which are described in greater depth below.

The TLAS 410 is built in world-space. TLAS primitives are instances of BLASs, which are defined in object-space. A TLAS can be constructed as a BVH with leaf nodes containing a BLAS. For example, the TLAS leaf nodes 422, 424, 426, and 428 each contain or are otherwise associated with one of the two BLASs 440 and 460. A translation matrix can be encoded in the TLAS leaf node to perform conversion from world-space to object-space and/or vice versa, as described in greater depth below.

A BLAS can be constructed for each object in a scene, referred to as a scene object. For example, FIG. 4A illustrates a BLAS 440 that may be constructed for a first unique scene object and a BLAS 460 that may be constructed for a second unique scene object. BLAS primitives can be the triangles or the AABBs of procedural primitives used to build the scene object. A bottom level BVH is built over the set of these triangles or AABBs of the scene object, with each BLAS leaf node containing a small number (e.g., up to four, five, or some other number) of triangles or AABBs. For example, in the context of FIG. 4A, the BLAS leaf nodes 452-458 and 472-478 can each contain some quantity of triangles, AABBs, or other primitives used to build the scene object. In some examples, a BLAS can also be referred to as a "bottom level BVH." Multiple instances of the same BLAS can be included in a TLAS. For example, if a TLAS includes a car object, then a BLAS of a tire can be included four times. The same BLAS can also be included in or referenced by multiple TLASs, as illustrated in FIG. 4A.

In some examples, a TLAS can be created using an Object-To-World matrix, which transforms an input represented in object-space coordinates to an output representation in world-space coordinates. A World-To-Object matrix can apply the transformation in the opposite direction (e.g., transforming an input represented in world-space coordinates to an output representation in object-space coordinates). In some cases, a TLAS can be built over a set of BLASs by using the Object-To-World matrix to compute the world-space AABB of each BLAS (e.g., the world-space AABB of the BLAS root nodes 442 and 462). A BVH is then built over these world-space AABBs of the BLAS root nodes and can be referred to as a top level BVH or the TLAS 410. In some cases, TLAS and BLAS creation can be performed using a similar or identical technique. For example, the same SAH-based (Surface Area Heuristic) algorithm or approach can be utilized for both TLAS and BLAS construction.

Figure 4B:
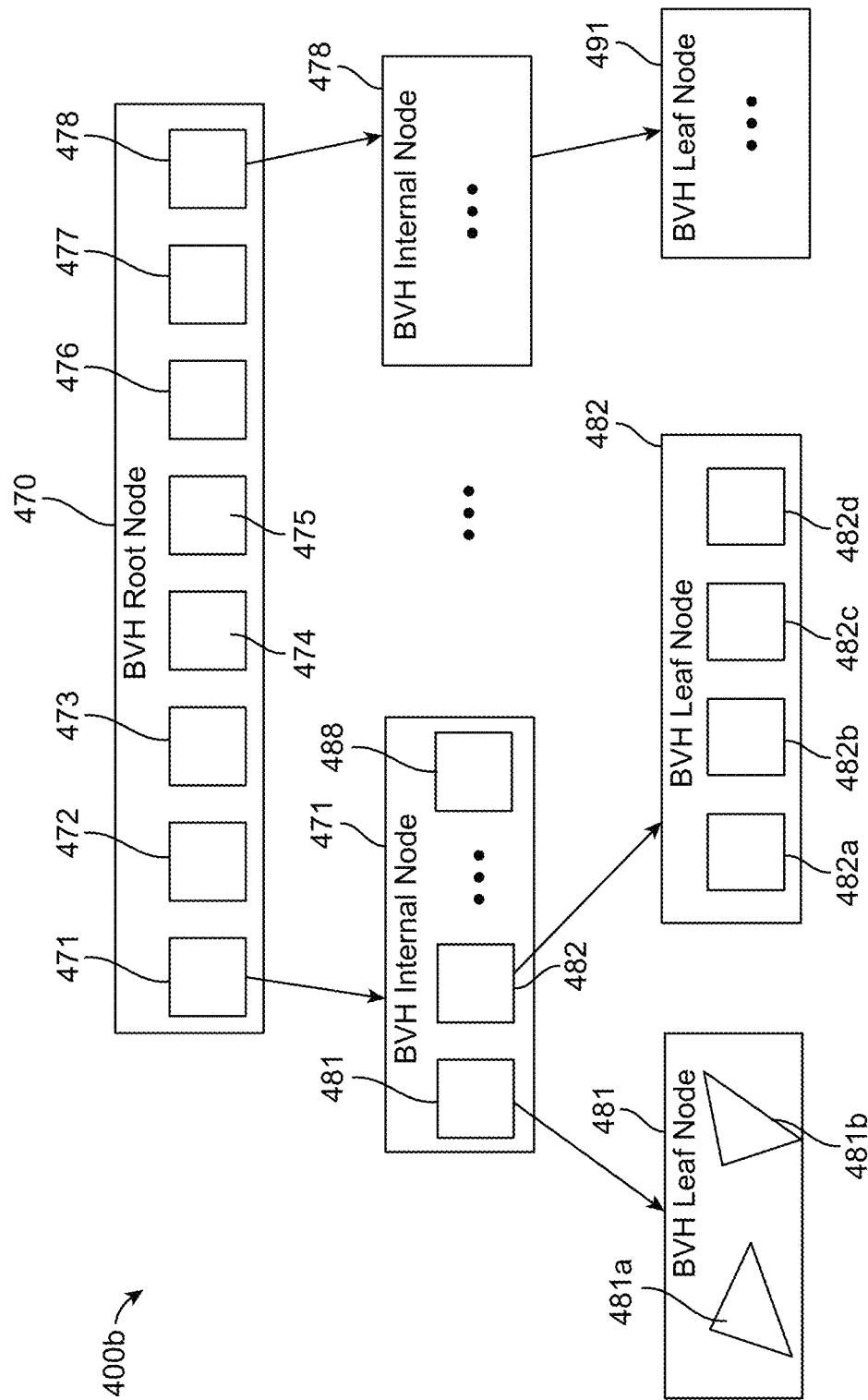
FIG. 4B illustrates an example of an acceleration data structure that includes leaf nodes containing triangles and leaf nodes containing bounding volumes, in accordance with some examples.

FIG. 4B is a diagram illustrating an example of an acceleration data structure 400b that includes or stores both triangles and bounding volumes. In some examples, acceleration data structure 400b can be a BVH (e.g., as is illustrated in FIG. 4B), although it is noted that other hierarchical tree structures and/or other acceleration data structures can also be utilized. As illustrated in FIG. 4B, acceleration data structure 400b (e.g., a BVH) includes a BVH root node 460 that includes a plurality of bounding volumes 471-478. The bounding volumes 471-478 can correspond to or otherwise be constructed for the child nodes of BVH root node 460. For instance, the eight bounding volumes 471-478 can be AABBs for eight corresponding child nodes of the BVH root node 460.

In the example of FIG. 4B, the acceleration data structure 400b has a branching factor of eight. The branching factor of an acceleration data structure is the maximum number of child nodes that may be associated with or contained by any parent node within the acceleration data structure. The number of child nodes associated with some internal nodes can be less than the branching factor. For example, acceleration data structure 400*b* has a branching factor of eight, but some internal nodes within acceleration data structure 400*b* may have less than eight child nodes. It is noted that a larger or smaller branching factor can also be used to generate an acceleration structure such as the acceleration data structure 400*b*. In cases where acceleration data structure 400*b* uses a larger or smaller branching factor, the BVH root node 460 and/or the BVH internal nodes (e.g., shown here as BVH internal nodes 471-478) can likewise include a greater or lesser number of bounding volumes or AABBs.

As mentioned above, BVH root node 460 includes AABBs for its eight child nodes 471-478. In some examples, the AABBs for child nodes 471-478 can be stored in the data structure of BVH 400*b* (e.g., included in the data representation of the parent node). For instance, the BVH root node 460 can include indices to data storage or memory locations where one or more of its child nodes 471-478 can be obtained or retrieved. In one illustrative example, the BVH root node 460 includes an index to only the first child node (e.g., the BVH internal node 471), with the remaining child nodes (e.g., nodes 472-478) stored adjacent to the memory index of the first child node 471.

Child node 471 is depicted in FIG. 4B as a BVH internal node 471, as node 471 is neither a root nor a leaf of BVH 400*b*. Internal nodes of BVH 400*b* (e.g., such as node 471) can have a number of child nodes that is lesser than or equal to the branching factor, which for BVH 400*b* is eight. In some examples, internal BVH nodes (e.g., such as node 471) can contain a bounding volume or AABB for each of their child nodes, as previously described above with respect to the BVH root node 460. BVH internal node 471 contains a plurality of bounding volumes 481-488, which in this case represent the eight child nodes of internal node 471. As illustrated in FIG. 4B, the child nodes of internal node 471 are BVH leaf nodes (e.g., leaf nodes of the BVH acceleration data structure 400*b*).

For example, the child nodes of internal node 471 include BVH leaf node 481 and BVH leaf node 482 (internal node 471 includes additional child nodes 483-488, which are omitted from the leaf node layer of FIG. 4B for clarity). As illustrated, BVH leaf node 481 includes two triangles 481*a* and 481*b*, which are geometric primitives that can be used to build a scene object or model represented by the BVH 400*b*. In some cases, the triangles 481*a*-481*b* can be enclosed by the corresponding AABB that is stored in internal node 471 for the BVH leaf node 481. In one illustrative example, the coordinates of the triangles 481*a*-481*b* can be stored directly in the underlying data structure of BVH 400*b* rather than being retrieved from an external data store or data location. For example, the coordinates (e.g., vertices) of triangles 481*a*-481*b* can be stored in the BVH leaf node 481 itself.

FIG. 4B depicts BVH leaf node 482 as including four bounding volumes (e.g., AABBs) 482*a*, 482*b*, 482*c* and 482*d*. In one illustrative example, the bounding volumes 482*a*-482*d* can be AABBs of procedural primitives (e.g., representing spheres or other user-defined shapes). In some examples, the bounding volumes 482*a*-482*d* can be AABBs of instances of BVHs. As was described above with respect to the BVH leaf node 481, it is noted that the four bounding volumes 482*a*-482*d* can be enclosed by the corresponding AABB that is stored in internal node 471 for the BVH leaf node 472. Although FIG. 4B depicts the BVH internal node 471 as including child nodes that contain triangles (e.g., BVH leaf node 481) and child nodes that contain bounding volumes (e.g., BVH leaf node 482), in some examples the BVH acceleration data structure 400*b* as a whole may include only leaf nodes that contain triangles or may include only leaf nodes that contain bounding volumes.

As mentioned previously, a BVH can store scene geometry (e.g., primitives) in a hierarchical grouping structure that can be used to accelerate the process of ray tracing by improving the efficiency of ray intersection tests. In some aspects, the same BVH may be used to perform ray intersection tests for primary rays (e.g., testing a primary ray for intersection with one or more primitives) and to perform ray intersection tests for shadow rays (e.g., testing a shadow ray for intersection with a light source or any opaque primitive included in the scene). In some aspects, the same BVH may additionally be used to perform ray intersection tests for reflection rays and/or refraction rays.

Primary ray intersection tests (e.g., among other types of ray intersection tests) can be performed based on a depth-first search (DFS) traversal of the BVH and/or other traversal techniques in which BVH nodes that are closer to the virtual camera (e.g., the origin of the primary ray(s)) are traversed first. In some cases, primary ray BVH traversal can be terminated after observing a maximum number of intersections and/or reflections associated with the primary ray. Primary ray BVH traversal may additionally, or alternatively, be terminated based on the primary ray traveling a certain distance without intersection.

In what may also be referred to as "shadow ray early termination," shadow ray BVH traversal can be terminated once the shadow ray either intersects any opaque primitive included in the scene, or once the shadow ray intersects the corresponding light source for which it was generated. In some examples, the efficiency and/or performance of shadow ray collision tests can decrease when shadow ray BVH traversal is also performed based on visiting BVH nodes based on distance from the virtual camera (e.g., when using the same BVH traversal technique as in primary ray intersection tests).

In some examples, a reflection ray intersection test can be performed as a primary ray intersection test (e.g., to determine whether the reflection ray intersects with any scene object(s) or scene primitive(s). In some examples, a reflection ray intersection test can be performed as a shadow ray intersection test (e.g., to determine whether the reflection ray reaches a light source). In some cases, a refraction ray intersection test can be performed as a primary ray intersection test (e.g., to determine whether the refraction ray intersects with any scene object(s) or scene primitive(s)) and/or can be performed as a shadow ray intersection test (e.g., to determine whether the refraction ray reaches a light source).

There is a need for systems and techniques that can be used to perform shadow ray intersection testing with improved BVH traversal efficiency.

As noted above, systems and techniques are described herein that can provide accelerated ray tracing operations for accelerating the traversal of a hierarchical acceleration data structure for ray tracing. An acceleration data structure is a data structure that can be used to store scene geometry (e.g., triangles and other primitives). For example, scene geometry and/or primitives can be grouped and stored at various levels (e.g., hierarchies) of the acceleration data structure. For example, a bounding volume hierarchy (BVH) is an acceleration data structure that can group scene primitives in a hierarchical tree of bounding volumes enclosing one or more of the scene primitives. Ray tracing can be performed by traversing these hierarchies to determine ray-primitive and/or ray-object intersections. In some examples, the systems and techniques can be used to provide accelerated ray traversal for traversing a bounding volume hierarchy (BVH). The BVH can include a plurality of primitives organized in a hierarchical tree structure, wherein the plurality of primitives is included in leaf nodes of the hierarchical tree structure. The BVH hierarchical tree structure can include a plurality of nodes (e.g., including the leaf nodes) that are organized into one or more different hierarchical levels.

In some aspects, the accelerated ray traversal can be performed based on obtaining one or more information values associated with each primitive of the plurality of primitives included in the BVH. In some examples, the systems and techniques can be used to provide accelerated ray traversal (e.g., for traversing a BVH) for primary rays, shadow rays, reflection rays, and/or refraction rays. In some aspects, the optimal BVH traversal technique for different types of rays may be different. For example, when primary ray BVH traversal is based on implementing a depth-first search (DFS) traversal of the BVH, the primary ray BVH traversal may achieve optimal performance if the BVH node(s) nearest the virtual camera viewpoint are traversed first. In another example, when shadow ray BVH traversal is based on implementing a DFS traversal of the BVH, the shadow ray BVH traversal may achieve optimal performance if the BVH node(s) associated with the greatest probability of intersecting an opaque primitive is traversed first.

In some examples, the systems and techniques can provide accelerated ray tracing operations that are accelerated based on a type of hierarchical structure being traversed for ray intersection testing, based on a type of ray being tested for intersection against the hierarchical structure, and/or based on a combination of the two. In one illustrative example, the systems and techniques can perform ray BVH traversal by using one or more information values associated with each primitive of the plurality of primitives included in the BVH to determine a sorting parameter value for each node included in the BVH. The sorting parameter values can be used to determine a sort order such that accelerates traversal of the BVH when the traversal is performed using the sort order. For example, the BVH traversal can use the sorting parameter values to prioritize visits to BVH nodes that may provide a ray intersection result more quickly.

For example, a primary ray BVH traversal can be accelerated by providing the systems and techniques with information values for the plurality of primitives that cause the resulting sorting parameter values to prioritize visits (e.g., during traversal) to BVH nodes that are nearest to the virtual camera viewpoint, and therefore may result in a primary ray-primitive intersection more quickly. A shadow ray BVH traversal can be accelerated by providing the systems and techniques with information values for the plurality of primitives that cause the resulting sorting parameter values to prioritize visits (e.g., during traversal) to BVH nodes that have the greatest probability of generating a shadow ray-opaque primitive intersection. A similar approach to selecting the information values for the plurality of primitives can be utilized to accelerate reflection ray BVH traversal and/or refraction ray BVH traversal, based on selecting the information values that will cause the systems and techniques to generate sorting parameter values that prioritize visits (e.g., during traversal) that prioritize visits to BVH nodes that are most likely to result in a reflection ray intersection result and/or a refraction ray intersection result, respectively.

Figure 5:
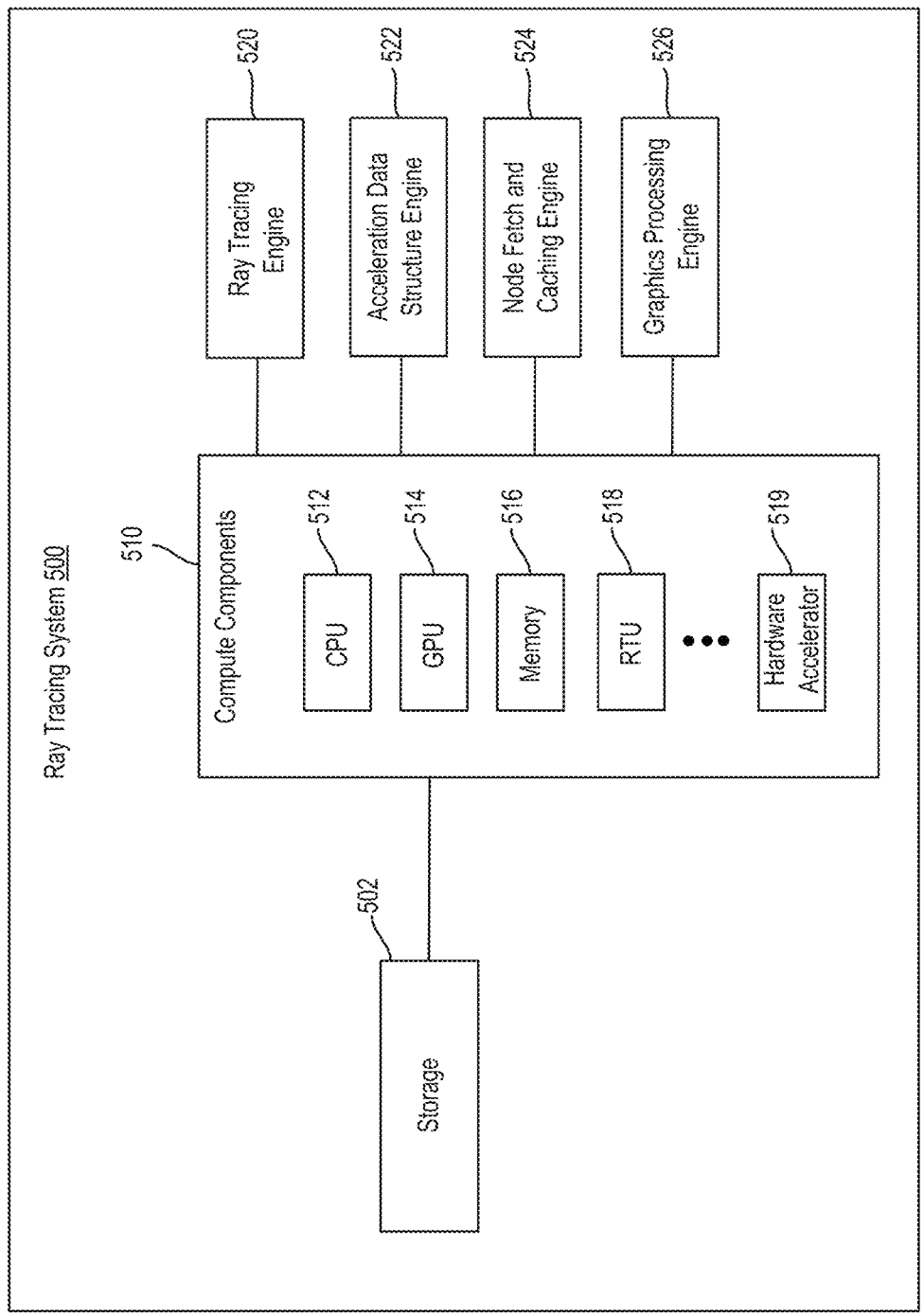
FIG. 5 is a simplified block diagram illustrating an example ray tracing system, in accordance with some examples.

FIG. 5 is a diagram illustrating an example ray tracing system 500, in accordance with some examples of the disclosure. The ray tracing system 500 can implement the systems and techniques disclosed herein, including aspects described above and aspects associated with FIGS. 6A-7. The ray tracing system 500 can perform various tasks and operations such as, for example, ray tracing tasks and operations (e.g., ray-primitive intersection, ray-bounding volume intersection, ray-triangle intersection, ray-AABB intersection, acceleration data structure construction and/or updating, rendering, etc.).

In the example shown in FIG. 5, the ray tracing system 500 includes storage 502, compute components 510, a ray tracing engine 520, an acceleration data structure engine 522, a node fetch and caching engine 524, and a graphics processing engine 526. It should be noted that the components 502 through 526 shown in FIG. 5 are non-limiting examples provided for illustration and explanation purposes, and other examples can include more, less, and/or different components than those shown in FIG. 5. For example, in some cases the ray tracing system 500 can include one or more display devices, one more other processing engines, one or more other hardware components, and/or one or more other software and/or hardware components that are not shown in FIG. 5. An example architecture and example hardware components that can be implemented by the ray tracing system 500 are further described below with respect to FIG. 9.

References to any of the components of the ray tracing system 500 in the singular or plural form should not be interpreted as limiting the number of such components implemented by the ray tracing system 500 to one or more than one. For example, references to a processor in the singular form should not be interpreted as limiting the number of processors implemented by the ray tracing system 500 to one. One of ordinary skill in the art will recognize that, for any of the components shown in FIG. 5, the ray tracing system 500 can include only one of such component(s) or more than one of such component(s).

The ray tracing system 500 can be part of, or implemented by, a single computing device or multiple computing devices. In some examples, the ray tracing system 500 can be part of an electronic device (or devices) such as a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, an extended reality (XR) device (e.g., a VR headset or had-mounted display (HMD), an AR headset, HMD, or glasses, etc.), or any other suitable electronic device(s).

In some implementations, the storage 502, compute components 510, ray tracing engine 520, acceleration data structure engine 522, node fetch and caching engine 524, and graphics processing engine 526 can be part of the same computing device. For example, in some cases, the storage 502, compute components 510, ray tracing engine 520, acceleration data structure engine 522, and graphics processing engine 526 can be integrated into a smartphone, laptop, tablet computer, smart wearable device, gaming system, and/or any other computing device. In other implementations, the storage 502, compute components 510, ray tracing engine 520, acceleration data structure engine 522, and graphics processing engine 526 can be part of two or more separate computing devices. For example, in some cases, some of the components 502 through 526 can be part of, or implemented by, one computing device and the remaining components can be part of, or implemented by, one or more other computing devices.

The storage 502 can be any storage device(s) for storing data. Moreover, the storage 502 can store data from any of the components of the ray tracing system 500. For example, the storage 502 can store data from the compute components 510, data from the ray tracing engine 520, data from the acceleration data structure engine 522, data from the node fetch and caching engine 524, and/or data from the graphics processing engine 526. In some examples, the storage 502 can include one or more buffers and/or caches for storing data for processing by the compute components 510. In some examples, the one or more buffers and/or caches can be general-use and available to some (or all) of the compute components 510. In some examples, the one or more buffers and/or caches can be provided specific to particular ones of the compute components 510.

The compute components 510 can include a central processing unit (CPU) 512, a graphics processing unit (GPU) 514, a memory 516, a Ray Tracing Unit 518, and/or one or more hardware accelerator components 519. In some implementations, the compute components 510 can include other processors or compute components, such as one or more digital signal processors (DSPs), one or more neural processing units (NPUs), and/or other processors or compute components. The compute components 510 can perform various operations such as ray-primitive intersection, ray-bounding volume intersection, ray-AABB intersection, acceleration data structure construction, acceleration data structure updating, scene rendering, rasterization, geometry processing, pixel processing, visibility processing, etc.

The operations for the ray tracing engine 520, the acceleration data structure engine 522, the node fetch and caching engine 524, and the graphics processing engine 526 (and any other processing engines) can be implemented by any of the compute components 510. In some cases, the operations of one or more of the ray tracing engine 520, the acceleration data structure engine 522, the node fetch and caching engine 524, and the graphics processing engine 526 can be executed by the CPU 512. In one illustrative example, the operations of one or more of the ray tracing engine 520, the acceleration data structure engine 522, the node fetch and caching engine 524, and the graphics processing engine 526 can be executed by the GPU 514. In some cases, the operations of one or more of the ray tracing engine 520, the acceleration data structure engine 522, the node fetch and caching engine 524, and the graphics processing engine 526 can be executed by the RTU 518 and/or the one or more hardware accelerators 519.

In some cases, the operations of one or more of the ray tracing engine 520, the acceleration data structure engine 522, the node fetch and caching engine 524, and the graphics processing engine 526 can be executed by one or more combinations of CPU 512, GPU 514, RTU 518, and hardware accelerators 519. In some cases, the compute components 110 can include other electronic circuits or hardware, computer software, firmware, or any combination thereof, to perform any of the various operations described herein.

In some examples, the ray tracing engine 520 can include one or more ray tracing Application Programming Interfaces (APIs). In one example, the ray tracing engine 520 can include one or more ray intersection engines. For example, ray tracing engine 520 can include one or more ray-primitive intersection engines and/or can include one or more ray-bounding volume intersection engines. In some cases, ray tracing engine 520 can include one or more ray-triangle intersection engines and/or can include one or more ray-AABB intersection engines. In some examples, the ray tracing engine 520 can implement one or more ray intersection engines using one or more hardware-accelerated ray tracing units (RTUs) and/or arithmetic logic units (ALUs).

In one illustrative example, the ray tracing engine 520 can communicate with RTU 518 (and/or hardware accelerators 519) to perform ray-primitive (e.g., ray-triangle) intersections and/or ray-bounding volume (e.g., ray-AABB) intersections. For example, in some cases the ray tracing engine 520 can provide one or more inputs and/or control signals to RTU 518 (and/or hardware accelerators 519). RTU 518 (and/or hardware accelerators 519) can use the inputs and control signals from ray tracing engine 520 to perform ray-primitive intersections and/or ray-bounding volume intersections and can communicate the ray intersection results back to ray tracing engine 520.

In some examples, the acceleration data structure engine 522 can construct or generate one or more acceleration data structures. The acceleration data structures generated by acceleration data structure engine 522 can be used by one or more of ray tracing engine 520, the node fetch and caching engine 524, and graphics processing engine 526. In one illustrative example, acceleration data structure engine 522 can construct or generate a Bounding Volume Hierarchy (BVH). In some cases, acceleration data structure engine 522 can generate two-level acceleration structures (e.g., an acceleration data structure including a TLAS and one or more BLASs). The acceleration data structure engine 522 can be implemented using the CPU 512, the GPU 514, or a combination of the two. In some examples, the acceleration data structure engine 522 can additionally, or alternatively, be implemented using one or more of the dedicated hardware accelerator components 519.

In some examples, the graphics processing engine 526 can include a graphics processing pipeline. For example, graphics processing engine 526 can include, but is not limited to, one or more of a geometry processing stage, a visibility stage, a rasterization stage, and a pixel processing pipeline. In some examples, graphics processing engine 526 can communicate with or access the memory 516 of the compute components 510. Memory 516 can include one or more of a system memory, a frame buffer, a graphics memory, one or more caches, etc. In some examples, graphic processing engine 526 can communicate with one or more of the RTU 518 and/or hardware accelerators 519 (e.g., of the compute components 510) and/or the ray tracing engine 520.

In some cases, the ray tracing system 500 (e.g., using the ray tracing engine 520, the acceleration data structure engine 522, the node fetch and caching engine 524, and/or the graphics processing engine 526) can obtain an acceleration data structure that includes one or more primitives of a scene object. For example, the ray tracing system 500 can obtain the acceleration data structure from storage 502 and/or memory 516. In some cases, the acceleration data structure can be generated or constructed using the acceleration data structure engine 522.

The acceleration data structure engine 522 can obtain one or more representations of a scene object or other scene geometry and generate and/or update a BVH or other acceleration data structure that includes the scene object or scene geometry. In some examples, the acceleration data structure engine 522 can obtain representations of a scene object or other scene geometry at least in part from one or more of the storage 502 and the memory 516. In some cases, the acceleration data structure engine 522 can obtain representations of a scene object or other scene geometry from the ray tracing engine 520 (and/or one or more of the compute components 510).

The acceleration data structure engine 522 can operate over representations of scene objects and scene geometry using both object-space representations and world-space representations. In some examples, the acceleration data structure engine 522 can use one or more Object-To-World matrices and/or World-To-Object matrices to transform scene objects/geometry from object-space representations into world-space representations, and from world-space representations to object-space representations, respectively.

As mentioned previously, the systems and techniques can be used to provide accelerated ray tracing operations for one or more types of rays. For example, the systems and techniques can provide accelerated primary ray tracing operations, acceleration shadow ray tracing operations, accelerated reflection ray tracing operations, and/or accelerated refraction ray tracing operations. In one illustrative example, primary ray tracing operations (e.g., primary ray BVH traversal) can be accelerated based on prioritizing (e.g., during traversal) visits to BVH nodes that are nearest to the virtual camera viewpoint. In another illustrative example, shadow ray tracing operations (e.g., shadow ray BVH traversal) can be accelerated based on prioritizing (e.g., during traversal) visits to BVH nodes that are associated with a greater (or greatest) probability of providing an opaque primitive hit or intersection.

Figure 6A:
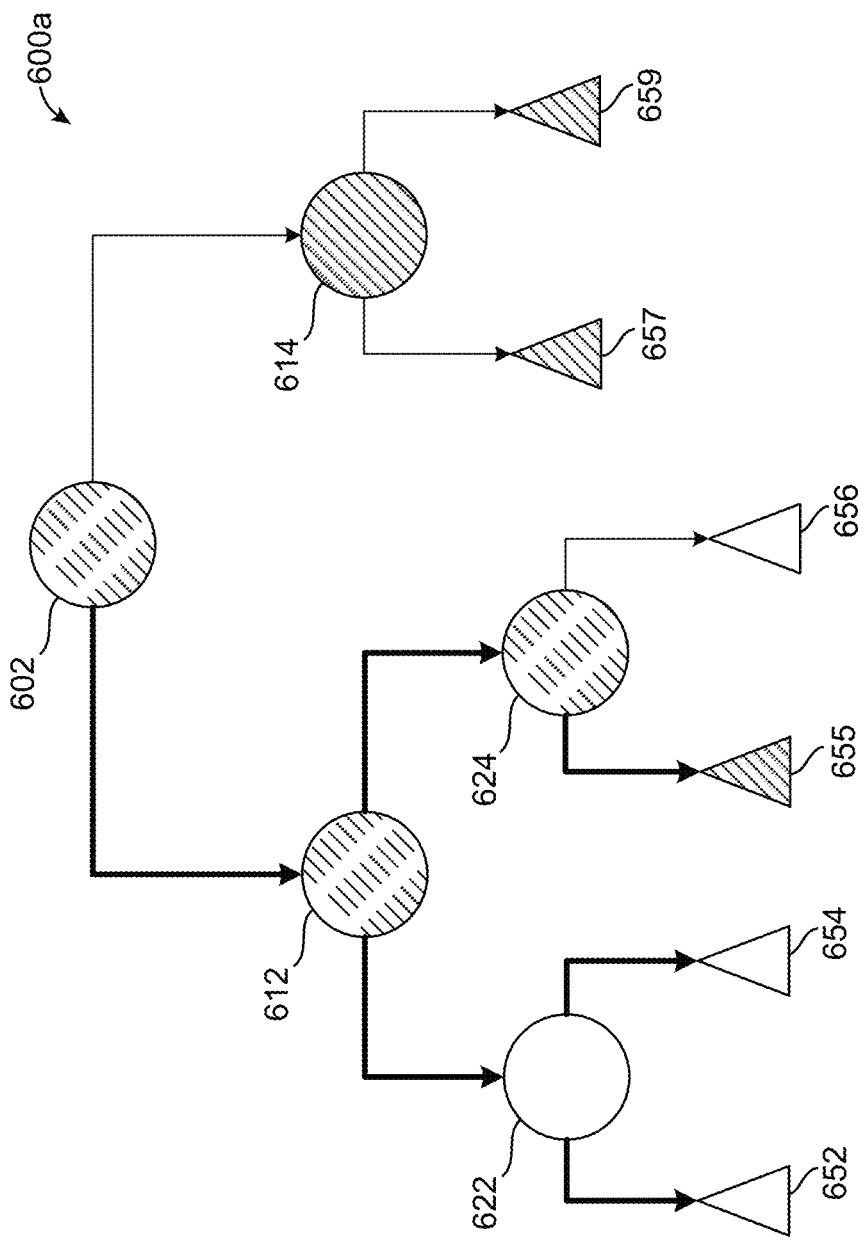
FIG. 6A illustrates an example of an acceleration data structure that may be used for ray traversal and intersection, in accordance with some examples.

For example, FIG. 6A depicts an example BVH 600a that can be traversed to perform a shadow ray intersection test. As illustrated, BVH 600a includes a root node 602, an internal node 612, and leaf nodes 614, 622, and 624, although other BVHs and/or other hierarchical tree-based acceleration data structures may also be utilized. For example, BVH 600a may include a larger or smaller quantity of internal nodes 612 and/or may include a larger or smaller quantity of leaf nodes 614, 622, 624. The BVH leaf nodes 614, 622, and 624 are depicted as each including two triangles (e.g., scene geometry or scene primitives). In some cases, one or more of the BVH leaf nodes 614, 622, 624 may additionally, or alternatively, include a larger or smaller quantity of primitives or other scene geometry. The BVH leaf nodes 614, 622, 624 may each include the same quantity and/or type of primitives. In some examples, the BVH leaf nodes 614, 622, 624 can include different quantities and/or types of primitives.

As mentioned previously, a shadow ray intersection test can be performed based on a previously determined intersection point (e.g., a hit point) between a primary ray and a scene primitive. In some aspects, a shadow ray intersection test can be performed based on traversing a BVH (e.g., such as BVH 600a) to determine an intersection point in the 3D scene that is associated with the projected shadow ray. For example, the shadow ray intersection test can be performed based on generating and projecting a shadow ray from the hit point to a light source in the scene and determining whether the shadow ray intersects an opaque scene primitive or reaches the light source. Based on a determination that the projected shadow ray reaches the light source, the hit point (e.g., the scene primitive previously intersected by a primary ray and used as the origin from which the shadow ray was projected) can be identified as directly illuminated by the light source. Based on a determination that the shadow ray does not reach the light source, the hit point can be identified as occluded or shadowed with respect to the light source.

As previously described above, a shadow ray intersection test may be different than a primary ray intersection test, based on the shadow ray intersection being terminated once the shadow ray either intersects with the light source or intersects with an opaque scene primitive (e.g., also referred to as "shadow ray early termination," as described previously). In some aspects, a shadow ray intersection test may additionally, or alternatively, be different than one or more of a refraction ray intersection test and/or a reflection ray intersection test. When a shadow ray intersection test exits via early termination, the path of the shadow ray is not projected beyond the intersection point between the shadow ray and the opaque primitive. For example, a shadow ray may not reach the light source towards which it was projected if the path of the shadow ray intersects with at least one opaque scene primitive (e.g., a scene can include multiple primitives in the path of a projected shadow ray, and it may be unnecessary to determine whether more than one shadow ray-primitive intersection exists).

In some cases, the shadow ray intersection test may ignore or invalidate any intersections between a shadow ray and a non-opaque (e.g., transparent) primitive, as a transparent primitive may not occlude or shadow the hit point from which the shadow ray was projected. For example, when non-opaque primitives are considered invalid shadow ray intersections, the shadow ray intersection test can be terminated once the shadow ray either intersects with the light source or intersects with any opaque scene primitive.

Shadow ray intersection testing can be performed based on traversing a BVH (e.g., such as BVH 600a). The BVH traversal associated with a shadow ray intersection test may also be referred to as "shadow ray BVH traversal" or "shadow ray traversal." In some examples, the same BVH 600a can be utilized (e.g., traversed) to perform primary ray intersection tests and to perform shadow ray intersection tests (and/or to perform reflection ray intersection tests and/or refraction ray intersection tests).

In some cases, the same traversal technique can be used to perform both shadow ray BVH traversal and primary ray BVH traversal. In some examples, a same traversal technique can be used for all ray BVH traversal types (e.g., shadow ray BVH traversal, primary ray BVH traversal, reflection ray BVH traversal, refraction ray BVH traversal). For example, a depth-first search (DFS) BVH traversal can be used to determine intersections or hits associated with primary rays, associated with shadow rays, associated with reflection rays, and associated with refraction rays.

In one illustrative example, DFS BVH traversal can be implemented as a traversal in which nodes and/or primitives (e.g., that are included in the BVH) are traversed beginning at a BVH root node (e.g., such as root node 602) and continuing deeper down the hierarchy of the BVH until a BVH leaf node is reached. For example, a DFS BVH traversal of BVH 600a can be performed by traversing from root node 602, to intermediate node 612, to leaf node 622. When the traversal reaches a leaf node (e.g., such as leaf node 622), the primitives included in or associated with the leaf node can be traversed, examined, or otherwise tested for intersection with the given ray being tested during the traversal. For example, from leaf node 622, the traversal can proceed by testing triangle 652 and triangle 654 (also referred to as non-opaque or transparent primitives 652, 654). If none of the triangles or other primitives associated with a leaf node result in a hit (e.g., intersection with the ray being tested), the DFS traversal can proceed by returning to the lowest-level node that has already been traversed but still has one or more not-yet-traversed child nodes. For example, the DFS traversal can proceed by returning to internal node 612, which was previously traversed (e.g., from internal node 612 to leaf node 622) but is not yet full traversed because one of its child nodes, leaf node 624, has not yet been traversed. Accordingly, after returning to internal node 612, the DFS traversal can proceed to leaf node 624. From leaf node 624, the DFS traversal can traverse, examine, or otherwise test the primitives included in or associated with leaf node 624 for intersection with the ray being tested. As illustrated, the DFS traversal can perform an intersection test for triangle 655 (also referred to as an opaque primitive 655). In response to determining an intersection or hit between the ray being tested and triangle 655, the BVH traversal for the ray being tested can exit (e.g., exit with the intersection/hit determined between the ray being tested and triangle 655).

In some aspects, a conventional DFS traversal may be performed without considering the type of ray being tested and/or the conditions that will cause the DFS traversal of the BVH to exit successfully. In some cases, traversing a BVH in DFS order may be inefficient or non-optimal based on performing intersection tests with one or more primitives that do not return a hit. Performing intersection tests with primitives that do not return a hit can be considered wasted or inefficiently utilized computational cycles. For example, in the example described above of traversing BVH 600a in DFS order, triangles 652 and 654 are traversed and tested for intersection, but do not result in a hit. An optimal traversal of BVH 600a in DFS order may be provided by sorting the nodes and/or primitives included in BVH 600a such that triangle 655 (e.g., which does result in a hit/intersection with the ray being tested) is traversed first or is otherwise more likely to be traversed first.

For example, an optimal BVH traversal technique for primary ray intersection testing can be to traverse the BVH nodes in the order of their distance from the imaginary camera viewpoint, such that the BVH node that is closest to the imaginary camera viewpoint is traversed first. However, a BVH traversal technique that is optimal for one type of ray intersection testing may not be optimal (or may be less optimal) for a different type of ray intersection testing.

For example, when a BVH is traversed for primary ray intersection testing, the traversal may exit when an intersection is determined between the primary ray and any primitive (e.g., either opaque or non-opaque). When a BVH is traversed for shadow ray intersection testing, the traversal may not exit if an intersection is determined between the shadow ray and a non-opaque primitive and will instead continue until an intersection is found between the shadow ray and an opaque primitive (or a light source in the scene). In some cases, performing shadow-ray traversal based on a primary-ray traversal technique can be inefficient. When a BVH includes opaque and non-opaque primitives, intersection tests performed between a shadow ray and any non-opaque primitives that are traversed can result in wasted clock cycles (e.g., because even if an intersection is found for the shadow ray and a non-opaque primitive, the intersection will be ignored or invalidated and the shadow ray BVH traversal continues).

For example, BVH 600a can include a combination of non-opaque (e.g., transparent) primitives 652, 654, and 656 and opaque primitives 655, 657, and 659. As illustrated, the non-opaque primitives 652, 654, 656 are unshaded, while the opaque primitives 655, 657, 659 are shaded. BVH nodes that include only non-opaque primitives are unshaded (e.g., BVH node 622). BVH nodes that include only opaque primitives are shaded (e.g., BVH node 614). BVH nodes that include both opaque and non-opaque primitives are partially shaded (e.g., BVH nodes 602, 612, and 624).

The bolded connecting arrows included in FIG. 6A illustrate an example of a shadow ray traversal technique with wasted clock cycles (e.g., from visiting non-opaque primitives). The example shadow ray traversal technique illustrated in FIG. 6A can be the same as or similar to a primary ray BVH traversal technique, such as the depth-first traversal technique described above wherein primitives closest to the virtual camera viewpoint are traversed first. In some aspects, the example shadow ray traversal of FIG. 6A may be performed independently of the contents of each BVH node (e.g., without considering whether a BVH node contains opaque primitives only, non-opaque primitives only, or a combination of the two).

For example, beginning at BVH root node 602, shadow ray traversal can proceed to BVH internal node 612, which includes the BVH leaf nodes 622 and 624. The traversal then continues from BVH internal node 612 to BVH leaf node 622, which includes as its children the non-opaque primitives 652 and 654.

The traversal can first visit the non-opaque primitive 652. Although any intersection determined between the shadow ray and the non-opaque primitive 652 can be ignored or invalidated (e.g., because non-opaque primitive 652 is transparent), the shadow ray traversal can perform an intersection test between the shadow ray and non-opaque primitive 652. For example, the intersection test can be performed based on invoking an any-hit shader and providing as input the shadow ray and the non-opaque primitive 652. The any-hit shader consumes one or more clock cycles to determine an intersection result. If the any-hit shader determines that the shadow ray and non-opaque primitive 652 do not intersect, the shadow ray traversal continues. If the any-hit shader determines that the shadow ray and non-opaque primitive 652 do intersect, the shadow ray traversal can also continue (e.g., because an intersection between the shadow ray and a non-opaque primitive is ignored or treated as invalid).

In this example, the shadow ray traversal pauses while the any-hit shader is invoked to determine an intersection result between the shadow ray and non-opaque primitive 652, but subsequently continues traversing BVH 600a regardless of the result determined by the any-hit shader (e.g., wasting the one or more clock cycles consumed by the any-hit shader invocation). Regardless of the result determined by the any-hit shader, the shadow ray traversal of BVH 600a proceeds next by visiting non-opaque primitive 654 (e.g., the remaining child of BVH leaf node 622).

The any-hit shader is again invoked, and one or more clock cycles consumed, to determine an intersection result between the shadow ray and non-opaque primitive 654. As described above with respect to non-opaque primitive 652, the shadow ray traversal of BVH 600a can subsequently proceed to visit the next BVH node regardless of the intersection result determined by the any-hit shader invocation for the shadow ray and non-opaque primitive 654.

For example, after invoking the any-hit shader to perform intersection tests for non-opaque primitives 652 and 654, the shadow ray traversal of BVH 600a can return to BVH node 612 and proceed to BVH leaf node 624. BVH leaf node 624 includes an opaque primitive 655 and a non-opaque primitive 656. Opaque primitive 655 may be visited first and the any-hit shader invoked to determine an intersection test result between the shadow ray and opaque primitive 655. If the any-hit shader determines that the shadow ray intersects with opaque primitive 655, the shadow ray traversal of BVH 600a can be terminated (e.g., based on shadow ray early termination, as described above).

In the example shadow ray traversal of BVH 600a illustrated in FIG. 6A, the any-hit shader is invoked three times before triggering the shadow ray early termination condition. The any-hit shader is twice invoked to determine an intersection result that can be ignored or invalidated (e.g., the intersection results between the shadow ray and the non-opaque primitives 652, 654), which can result in wasted clock cycles and/or a prolonged shadow ray BVH traversal time. Wasted clock cycles and prolonged shadow ray BVH traversal times can decrease the efficiency of ray tracing operations for shadow rays. For example, a shadow ray intersecting with or hitting a non-opaque (e.g., transparent) primitive can be associated with a polynomial degradation of performance.

Systems and techniques for accelerating BVH traversal based on a type of ray being tested (and/or based on a type of ray intersection test being performed) are needed that minimize intersection testing against primitives that are less likely to result in an intersection result that triggers the traversal to exit (e.g., that are less likely to provide a hit or intersection).

The systems and techniques described herein can be used to perform primary ray BVH traversal, shadow ray BVH traversal, reflection ray BVH traversal, and/or refraction ray BVH traversal with increased efficiency. For example, the systems and techniques can utilize one or more information values that are obtained for each primitive included in a given BVH to calculate sorting parameter values for some (or all) of the BVH nodes. Based on the respective sorting parameter values determined for the BVH nodes, the systems and techniques can perform accelerated traversal of the BVH by using a sort order that is determined based on the sorting parameter values. In one illustrative example, the systems and techniques can use the sorting parameter values to perform BVH traversal that prioritizes visits to BVH nodes that are more likely to provide a ray intersection result (e.g., that are more likely to provide a ray intersection result more quickly).

As mentioned previously, an information value can be obtained for each primitive (and/or procedural primitive) that is included in the BVH. In some aspects, the information value can be obtained using an Application Programming Interface (API) that is associated with a BVH traversal operation. For example, the information values can be obtained using a ray tracing API that is associated with or included in one or more of the ray tracing engine 520 and/or the acceleration data structure engine 522 illustrated in the ray tracing system 500 of FIG. 5.

The information value can be indicative of one or more properties or measurements associated with a primitive. For example, the information value can be indicative of a Surface Area Heuristic (SAH) value, an opaqueness of the primitive, an area of the primitive, a density of the primitive, a distance of the primitive from the virtual camera viewpoint, material information of the primitive, a Level-of-Detail (LOD) of the primitive, a complexity, etc. In some examples, the information value can additionally, or alternatively, be indicative of a complexity of one or more procedural primitives. In such examples, information values indicative of the complexity of procedural primitives can be used to accelerate traversal by traversing the path (e.g., through the nodes of a given BVH) associated with a less complex geometry (e.g., the path with a least complex geometry) before traversing any other paths.

In some aspects, at least one information value can be provided for each primitive included in a given hierarchical acceleration data structure (e.g., BVH). In some examples, the same quantity of information value(s) can be provided per primitive (e.g., one information value per primitive, two information values per primitive, etc.). Additionally, or alternatively, the same type of information value(s) can be provided per primitive. For example, each primitive can be associated with an information value that is indicative of an opacity of the respective primitive, or each primitive can be associated with an information value that is indicative of a distance of the respective primitive from the virtual camera viewpoint, etc.

Figure 6B:
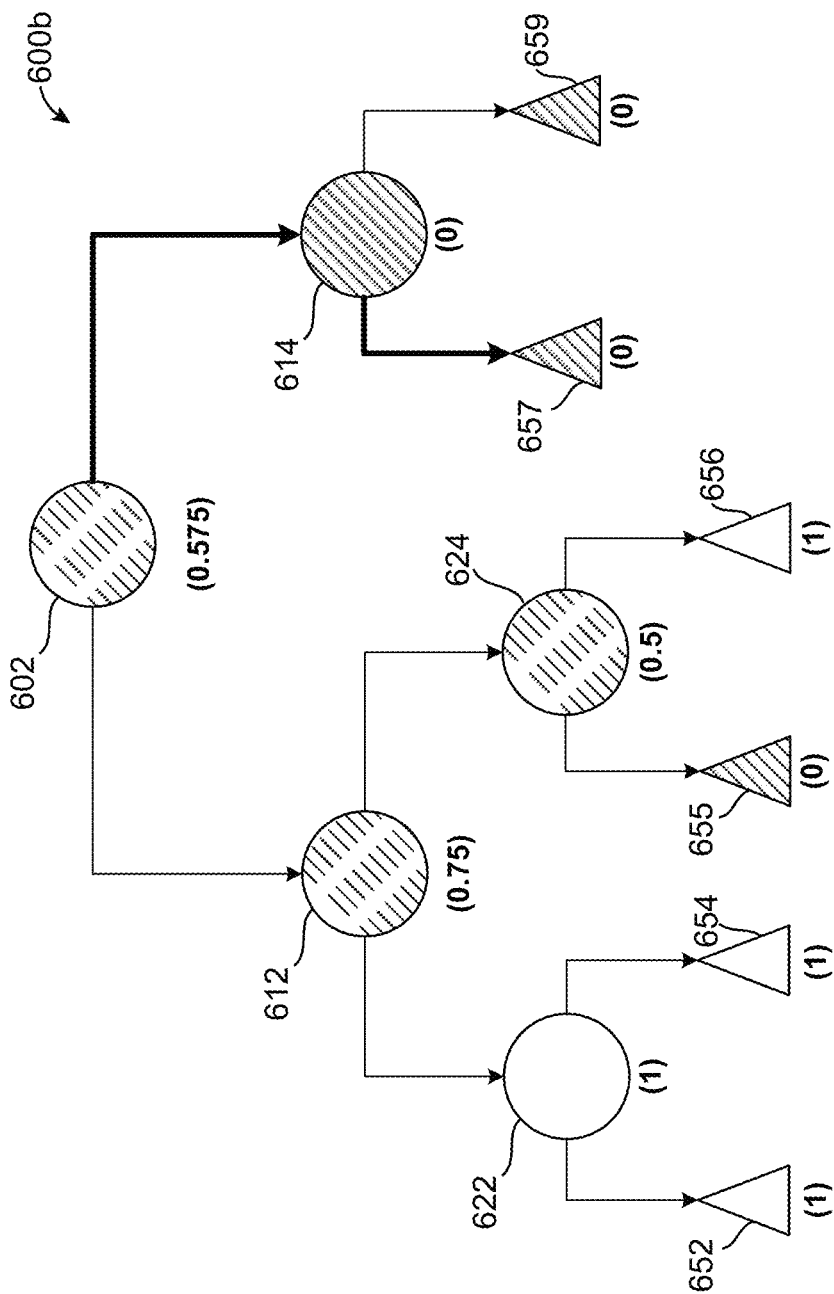
FIG. 6B illustrates an example of an acceleration data structure that includes one or more information values associated with each respective primitive of a plurality of primitives included in the acceleration data structure, in accordance with some examples.

For example, FIG. 6B depicts an example BVH 600b wherein an information value is obtained for each of the primitives included in BVH 600b and used to perform accelerated BVH traversal operations. In one illustrative example, an information value is obtained for each of the triangles 652, 654, 655, 656, 657, and 659 that are included in BVH 600b. The information value can be a numerical value and is depicted in parentheses under each of the respective triangles 652-659 (e.g., "(0)" or ("1")). In some aspects, the information values can be numerical values that are normalized within a given range of values. For example, the information values can be numerical values, such as a distance of the primitive from the virtual camera viewpoint, that are normalized to a range of [0,1]. In some cases, the information values can be numerical values or measurements that are not normalized (e.g., the information value representing a measured quantity, property, or characteristic of a given primitive can be the same as the actual measured value of the quantity, property, or characteristic of the given primitive).

In some examples, one or more (or all) of the information values obtained for each primitive of the plurality of primitives included in a BVH can be obtained from a ray tracing API. For example, the information values can be included in a render list that is used to construct a BVH and/or render a scene by performing ray tracing operations using the BVH. In some examples, the render list can comprise tabular data associated with the plurality of primitives (e.g., each primitive is represented by one or more rows of the tabular data, and properties or other information associated with the primitives are represented by one or more columns of the tabular data). In some examples, the information values used by the systems and techniques described herein to perform accelerated BVH traversal can be obtained as entries in one or more columns of a render list associated with the plurality of primitives included in the BVH. In some aspects, the systems and techniques can obtain the information values for the plurality of primitives from an ISV (Independent Software Vendor) and/or an IHV (Independent Hardware Vendor), wherein the ISV or IHV implement a software ray tracing renderer and a hardware ray tracing renderer, respectively. For example, an ISV and/or IHV ray tracing render can utilize a ray tracing API to communicate with the system and techniques described herein and to provide the information values for the primitives included in a BVH (e.g., using a render list as described above, or various other API-based communications and messages). In some aspects, based on the use of a pre-determined accelerated BVH traversal technique (e.g., DSF traversal) and/or the use of a pre-determined technique for computing respective sorting parameter values for each BVH node and subsequently sorting the BVH nodes using the respective sorting parameter values, the information values provided for the plurality of primitives can be selected such that the BVH traversal is accelerated, as will be described in greater depth below.

For example, the BVH 600b depicted in FIG. 6B can be the same as the BVH 600a depicted in FIG. 6A and described above with respect to a conventional DSF traversal for shadow ray intersection testing. Continuing in the example of performing DSF traversal for shadow ray intersection testing, BVH 600a and/or BVH 600b can be optimally or more efficient traversed if opaque nodes are tested first (e.g., because even if an intersection is determined between a shadow ray and a non-opaque primitive is determined, the shadow ray traversal will continue until an intersection is determined between the shadow ray and an opaque primitive). In one illustrative example, an optimal shadow ray traversal of BVH 600a and/or 600b can comprise a traversal from BVH root node 602 to BVH internal node 614 to one of the opaque triangles 657 or 659. However, this optimal traversal route will not be the first traversal route when a DSF traversal is performed for BVH 600b (e.g., the first traversal route when a DSF traversal is performed for BVH 600b can be the same as the bolded traversal route depicted in FIG. 6A and described above).

In one illustrative example, the systems and techniques can be used to accelerate BVH traversal without modifying the BVH traversal technique. For example, BVH traversal can be accelerated while still using a conventional DSF traversal technique. The BVH traversal can be accelerated based on sorting parameter values that are associated with each BVH node (e.g., nodes 602, 612, 614, 622, and 624), wherein the sorting parameter values are calculated based on the information values assigned to each of the plurality of primitives 652, 654, 655, 656, 657, and 659.

For example, to accelerate shadow ray BVH traversal, the information values can be assigned to the plurality of primitives 652-659 based on whether each primitive (e.g., triangle) is opaque or non-opaque. As illustrated, the non-opaque triangles 652, 654, and 656 can each be assigned an information value of 1 and the opaque triangles 655, 657, and 659 can each be assigned an information value of 0. In some aspects, greater granularity can be utilized in assigning the information values. For example, instead of a binary scheme in which a primitive is assigned either a value of 0 or 1, the information value can be a decimal number that is indicative of a degree of opacity or other measurement of opacity associated with each primitive, etc.

In some aspects, the information values obtained for the primitives of BVH 600b can be propagated up the hierarchical tree structure of BVH 600b and used to determine the respective sorting parameter value for each node of the plurality of nodes included in BVH 600b. Shadow ray traversal of BVH 600b can be accelerated by sorting the nodes included in BVH 600b based on their respective sorting parameter values, such that nodes having a greater probability of providing a shadow ray-opaque primitive intersection are traversed first in a DFS traversal. In some examples, when non-opaque primitives are assigned an information value of 1 and opaque primitives as assigned an information value of 0, the shadow ray traversal of BVH 600b can be accelerated by sorting the nodes included in BVH 600b such that the DFS traversal will first visit the BVH node(s) with the lowest sorting parameter value. Because the sorting parameter values are calculated based on the information values of the triangles, a BVH node with the greatest probability of a shadow ray-opaque primitive intersection may be the BVH node with the lowest sorting parameter value (e.g., because a value of 0 is associated with opaque primitives).

In one illustrative example, the sorting parameter value for a given BVH node can be determined using a functional computation that takes as input the sorting parameter value(s) associated with the child nodes of the given BVH node. Child nodes of a given BVH node can include one or more of BVH leaf nodes, BVH internal nodes, and/or primitives. For example, the child nodes of a given BVH node can be included in a sub-tree of the given BVH node (e.g., wherein the given BVH node is the root node of its sub-tree) and/or included in a top level of the sub-tree of the given BVH node. When the given BVH node is a leaf node, the same functional computation can be performed, taking as input instead the information value(s) associated with the primitives associated with or included in the given BVH leaf node. For example, the functional computation may be determining a mean or an average value, although various other functional computations may also be utilized, including, but not limited to, determining a median, a mode, a windowed average, a minimum, a maximum, etc. In some aspects, the functional computation can be specified as an input to the systems and techniques described herein. For example, an identifier of a functional computation to utilize in generating the sorting parameter values for the plurality of BVH nodes included in a given BVH can be provided as input using a ray tracing API (e.g., which may be the same as a ray tracing API used to specify the information values for the primitives included in the given BVH).

As mentioned previously, the information values obtained for the primitives of BVH 600b can be propagated up the hierarchical tree structure of BVH 600b and used to determine the respective sorting parameter value for each node of the plurality of nodes included in BVH 600b. For example, beginning at the leaf nodes of BVH 600b (e.g., leaf nodes 622, 624, and 614), a respective sorting parameter value for each BVH leaf node can be determined using the information values associated with the triangles or other primitives that are included in each BVH leaf node.

For example, when the functional computation for determining the sorting parameter values is an averaging operation, the sorting parameter value determined for BVH leaf node 622 can be the average of the information values associated with triangles 652 and 654. As illustrated, triangles 652 and 654 are each non-opaque triangles and are each assigned an information value of 1. The sorting parameter value determined for BVH leaf node 622 is therefore 1.

The sorting parameter value for BVH leaf node 624 can be determined as the average of the information values associated with triangles 655 and 656. As illustrated, triangle 655 is an opaque triangle assigned an information value of 0 and triangle 656 is a non-opaque triangle assigned an information value of 1. The sorting parameter value determined for BVH leaf node 624 is therefore 0.5.

The sorting parameter value for BVH leaf node 614 can be determined as the average of the information values associated with triangles 657 and 659, which are both opaque triangles and are both assigned an information value of 0. The sorting parameter value determined for BVH leaf node 614 is therefore 0.

The sorting parameter value(s) associated with BVH internal nodes and/or a BVH root node can be determined by applying the same functional computation (e.g., averaging) to the sorting parameter value(s) of the child nodes associated with each BVH internal node or root node. In some examples, the sorting parameter value(s) associated with BVH internal nodes and/or a BVH root node can be determined by applying the same functional computation (e.g., averaging) to sorting parameter value(s) determine based on one or more information values associated with a corresponding one or more primitives included in a sub-tree of the node. For example, the child nodes of BVH internal node 612 are BVH leaf node 622 (e.g., associated with a sorting parameter value of 1) and BVH leaf node 624 (e.g., associated with a sorting parameter value of 0.5). Based on averaging the sorting parameter values of its two child nodes, the sorting parameter value for BVH leaf node 612 can be determined to be 0.75.

Similarly, the child nodes of BVH root node 602 are BVH internal node 612 (e.g., associated with a sorting parameter value of 0.75 and BVH leaf node 614 (e.g., associated with a sorting parameter value of 0). Based on averaging the sorting parameter values of its tow child nodes, the sorting parameter value for BVH root node 602 can be determined to be 0.575.

Accelerating BVH traversal for a given type of ray (e.g., primary ray, shadow ray, reflection ray, refraction ray) can be performed using the sorting parameter values determined for each node included in the BVH, wherein the sorting parameter values are indicative of a relative probability that visiting or traversing a given BVH node will result in an intersection or hit result that causes the BVH traversal to exit successfully.

For example, shadow ray BVH traversal can be performed by selecting (e.g., visiting), at each level of the BVH, the BVH node(s) associated with an increased probability of intersecting the shadow ray with an opaque primitive. In some aspects, a BVH can be traversed in a depth-first search (DFS) wherein selection decisions (e.g., between the multiple BVH nodes that can be traversed or visited next) are based on a probability of the shadow ray intersecting an opaque primitive included in a given BVH node.

The probability of the shadow ray intersecting an opaque primitive can be indicated by or otherwise determined based on the sorting parameter value associated with a given BVH node. In the example of FIG. 6B, a BVH node with a lower sorting parameter value than another BVH node at the same level of the BVH may be associated with a greater probability of the shadow ray intersecting an opaque primitive (e.g., because a BVH node with a lower sorting parameter value includes a greater percentage of opaque primitives than a BVH node with a higher sorting parameter value, based on the opaque primitives being assigned information values of 0 and the non-opaque primitives being assigned information values of 1).

In one illustrative example, the BVH nodes of a given BVH level (e.g., nodes 622 and 624 are included in a first level of BVH 600*b*, nodes 612 and 614 are included in a second level of BVH 600*b*, and node 602 is included in a third level of BVH 600*b*) can be sorted in an increasing or decreasing order based on each node's sorting parameter value. For example, when a lower information value is assigned to primitives that produce a desirable result (e.g., an intersection or hit that allows the BVH traversal to exit successfully; such as assigning an information value of 0 to opaque primitives in a shadow ray BVH traversal), the BVH nodes of each level of BVH 600*b* can be sorted in an increasing order (e.g., from left to right). When a higher information value is assigned to primitives that produce a desirable. Result, the BVH nodes of each level of BVH 600*b* can be sorted in a decreasing order (e.g., from left to right). Based on the sort order of the BVH nodes at each level of BVH 600*b*, a DFS traversal (e.g., which may always select a left-most branch for traversal, when multiple branches are available for the next traversal step) of BVH 600*b* after sorting can automatically visit (e.g., traverse to) the BVH node at each level that is associated with the greatest possibility of producing a desired result that permits early termination of the traversal process.

In the example of shadow ray traversal of BVH 600*b*, the sorting parameter values determined for each node included in BVH 600*b* can be used to sort the nodes included in each level of BVH 600*b* in an increasing order from left to right.

Based on this sort order, the left-most node at each BVH level will be the node with the lowest sorting parameter value (e.g., and therefore the node with the greatest probability of resulting in a shadow ray-opaque primitive intersection that allows the BVH traversal to successfully exit). In the increasing order sorting based on the respective sorting parameter values determined for each node of a given BVH level, the BVH node with the lowest sorting parameter value is provided first in the sort order and the BVH node with the greatest sorting parameter value is provided last in the sort order.

For example, at the first (e.g., bottom) BVH level of BVH 600*b*, leaf node 624 would be provided first in the sort order and leaf node 622 would be provide last in the sort order, based on their respective sorting parameter values of 0.5 and 1. At the second (e.g., middle) BVH level of BVH 600*b*, leaf node 614 would be provided first in the sort order and internal node 612 would be provided last in the sort order, based on their respective sorting parameter values of 0 and 0.75.

Based on the sorting parameter values depicted in FIG. 6B for each node included in BVH 600*b*, an accelerated shadow ray BVH traversal may be performed beginning at root node 602 and traversing first to BVH leaf node 614 (e.g., which has a sorting parameter value of 0 and contains only opaque primitives) rather than traversing first to BVH internal node 612 (e.g., which has a sorting parameter value of 0.75 and contains two BVH leaf nodes and four primitives, only one of which is opaque). Shadow ray BVH traversal can then exit successfully in the next traversal step, when either opaque primitive 657 or opaque primitive 659 is visited. In some aspects, the shadow ray traversal described above with respect to BVH 600*b* is accelerated relative to the shadow ray traversal described with respect to BVH 600*a* of FIG. 6A, as a DFS traversal of the sorted BVH 600*b* (e.g., based on the systems and techniques using the determined sorting value parameters and/or the sort order of BVH nodes at each BVH level) is successfully completed in two steps (e.g., node 602 to node 614 to opaque primitive 657) whereas the DFS traversal of the un-sorted BVH 600*a*/600*b* is successfully completed in a significantly greater number of steps (e.g., 602-612-622-652-622-654-622-612-624-655).

In one illustrative example, the approach described above for determining the respective sorting parameter values for each BVH node included in a given BVH and subsequently accelerating shadow ray traversal based on a sort order that prioritizes DFS traversal of the node at each BVH level with the greatest probability of intersecting an opaque primitive may also be utilized to accelerate one or more additional ray type BVH traversals.

For example, a ray (e.g., such as a primary ray) may need only a first intersection result to be returned, rather than a closes intersection result. In such a scenario, the traversal logic for the primary ray can be the same as the traversal logic for a shadow ray. In some examples, a RAY_FLAG_ACCEPT_FIRST_HIT_AND_END_SEARCH can be set and used to indicate that BVH traversal for the ray can be accelerated using the technique described above for shadow ray BVH traversal.

Figure 7:
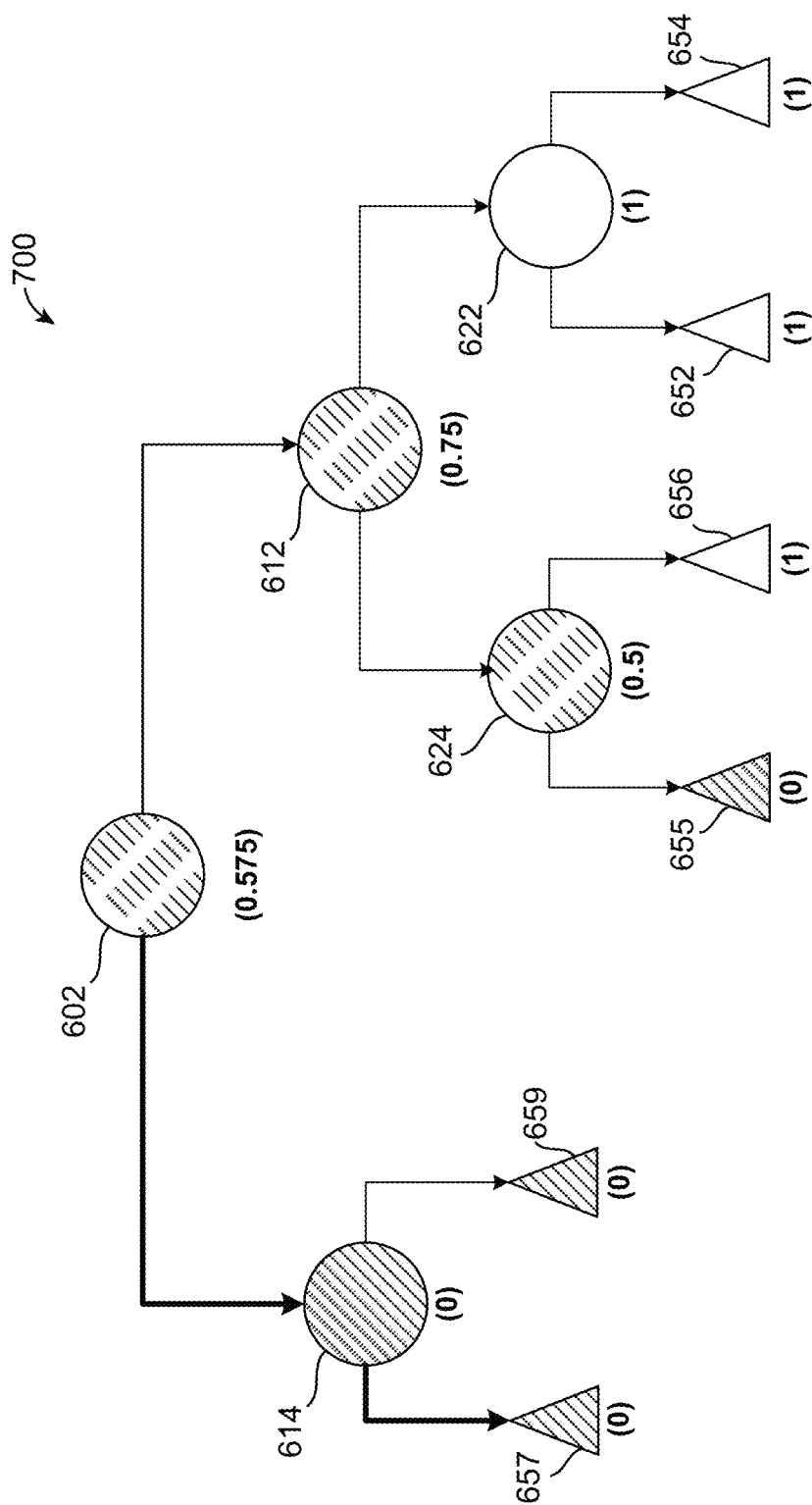
FIG. 7 illustrates an example of an updated acceleration data structure with one or more nodes sorted into a sort order based on a respective sorting parameter value associated with each node, in accordance with some examples.

In some examples, the systems and techniques can obtain the information values for each primitive included in a given hierarchical acceleration data structure (e.g., BVH) and may use the information to generate a new or updated hierarchal acceleration data structure (e.g., BVH) that has been sorted using values the subsequently determined sorting parameter values at each node and/or the sort order. For example, an updated hierarchical acceleration data structure 700 is illustrated in FIG. 7 and may be generated based on applying an increasing sort order of sorting parameter value at each BVH level of BVH 600b.

In one illustrative example, when an updated hierarchical acceleration data structure or BVH (e.g., updated hierarchical acceleration data structure 700) is generated by using a determined sort order and/or determined sorting parameter values for each BVH node and each BVH Level of an existing BVH (e.g., BVH 600b), the updated hierarchical acceleration data structure can be generated without storing either the sorting parameter values at each BVH node or the information values at each primitive included in the BVH. For example, because the updated BVH (e.g., updated hierarchical acceleration data structure 700) is generated (e.g., sorted into a sort order) such that the first node visited at a given BVH level when a pre-determined traversal strategy (e.g., DFS traversal) is applied, traversal of the updated hierarchical BVH can be accelerated without needing to reference the sorting parameter values associated with each BVH node.

FIG. 8 is a flowchart illustrating an example of a process 800 for graphics processing. Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At block 802, the process 800 includes obtaining a hierarchical acceleration data structure, the hierarchical acceleration data structure including a plurality of primitives of a scene object. For example, the plurality of primitives can include a plurality of triangles, axis-aligned bounding boxes (AABBs), and/or other scene geometry and/or scene primitives. In some examples, the plurality of primitives can be similar to one or more of the primitives (e.g., triangles) illustrated in FIGS. 2A-2B In some cases, the hierarchical acceleration data structure can be obtained by or from the acceleration data structure engine 522 associated with the ray tracing system 500 illustrated in FIG. 5. In some cases, the hierarchical acceleration data structure can include a bounding volume hierarchy (BVH).

In some examples, the hierarchical acceleration data structure can be a BVH that is the same as or similar to the BVH 200b illustrated in FIG. 2B as including the plurality of primitives (e.g., triangles) 252a-252e. In some cases, the hierarchical acceleration data structure may include a TLAS and a BLAS, such as the TLAS 410 and BLAS 430 illustrated in FIG. 4A. In some examples, the hierarchical acceleration data structure can be a BVH that is the same as or similar to the BVH 400b illustrated in FIG. 4B, the BVH 600a illustrated in FIG. 6A, the BVH 600b illustrated in FIG. 6B, the BVH 700 illustrated in FIG. 7, etc.

At block 804, the process 800 includes obtaining a respective information value associated with each primitive included in the plurality of primitives. For example, each respective information value associated with each primitive can include at least one of a Surface Area Heuristic (SAH) value, an opaqueness value, or a density value. In some cases, each respective information value associated with each primitive can include at least one of an area value, a distance value between each respective primitive and a camera associated with the scene object, or a level-of-detail (LOD) value. In some examples, each primitive included in the plurality of primitives can be associated with the same type of information value. In some cases, each primitive can be associated with the same quantity and/or type(s) of information value(s).

In some examples, each respective information value associated with each primitive can be included as an entry in a render list associated with the scene object. For example, the respective information values associated with each primitive can be obtained as an input to a ray tracing Application Programming Interface (API). In some examples, the ray tracing system 500 illustrated in FIG. 5 can include the ray tracing API. For example, the ray tracing API can be included in one or more of the ray tracing engine 520, the acceleration data structure engine 522, the node fetch and caching engine 524, etc.

In some examples, the information value may comprise an opaqueness value, wherein at least a first value of the opaqueness value is indicative of an opaque primitive and at least a second value of the opaqueness value is indicative of a non-opaque primitive. For example, a value of '0' may be assigned to an opaque primitive and a value of '1' may be assigned to a non-opaque primitive.

At block 806, the process 800 includes determining a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes. For example, the sort order can be a decreasing order based on each respective sorting parameter value associated with each respective node of the two or more nodes.

In some examples, each respective sorting parameter value determined for each respective node of the two or more nodes may comprise a calculated value based on sorting parameter values determined for one or more child nodes associated with each respective node. For example, the calculated value can be an average of the respective sorting parameter value determined for the one or more child nodes. In some cases, the calculated value can be determined based on a functional computation specified as an input to a ray tracing API.

In some cases, a respective sorting parameter value can be determined for each respective node of one or more nodes included in a first level of the hierarchical acceleration data structure. Based on the respective sorting parameter value determined for each respective node of the one or more nodes included in the first level, a respective sorting parameter value can be determined for each respective node of one or more nodes included in a second level of the hierarchical acceleration data structure. For example, the one or more nodes included in the first level can be child nodes of the one or more nodes include in the second level (e.g., which are parent nodes to the nodes included in the first level).

In some cases, the one or more nodes included in the first level can be leaf nodes of the hierarchical acceleration data structure, wherein each respective leaf node is associated with one or more primitives of the plurality of primitives. In some cases, a respective sorting parameter value determined for each respective leaf node can be a calculated value based on at least one information value determined for one or more primitives associated with each respective leaf node.

At block 808, the process 800 includes traversing the hierarchical acceleration data structure using the sort order. In some examples, the sort order is a decreasing order based on each respective sorting parameter value associated with each respective node of the two or more nodes. In some cases, the sort order can be an increasing order based on the respective sorting parameter values.

In some examples, a depth first search (DFS) traversal of the hierarchical acceleration data structure can be performed using the sort order. The sort order can be determined based on at least one information value associated with each primitive of the plurality of primitives, and at least one sorting parameter value associated with each node of a plurality of nodes included in the hierarchical acceleration data structure.

In some cases, traversing the hierarchical acceleration data structure may comprise traversing from a parent node to a selected child node associated with the parent node, wherein the selected child node is selected based on a sorting parameter value associated with the selected child node. For example, the selected child node can be selected from one or more child nodes associated with the parent node, wherein the selected child node is associated with a maximum sorting parameter value or a minimum sorting parameter value of the one or more child nodes.

In some examples, traversing the hierarchical acceleration data structure comprises generating an updated hierarchical acceleration data structure based on the sort order, wherein a plurality of primitives included in the updated hierarchical acceleration data structure is the same as the plurality of primitives included in the hierarchical acceleration data structure. In some cases, the updated hierarchical acceleration data structure includes a plurality of nodes, each respective node in a plurality of nodes included in a respective level of a plurality of levels included in the hierarchical acceleration data structure. The updated hierarchical acceleration data structure can be generated based on sorting one or more nodes included in each respective level of the plurality of levels such that a depth first search (DFS) traversal of the updated hierarchical acceleration data structure traverses the plurality of nodes in the sort order.

In some examples, ray tracing graphic content can be generated based on traversing the hierarchical acceleration data structure using the sort order.

In some examples, the processes described herein (e.g., process 800 and/or any other process described herein) may be performed by a computing device, apparatus, or system. In one example, the process 800 can be performed by a computing device or system having the computing device architecture 900 of FIG. 9. The computing device, apparatus, or system can include any suitable device, such as a mobile device (e.g., a mobile phone), a desktop computing device, a tablet computing device, a wearable device (e.g., a VR headset, an AR headset, AR glasses, an extended reality (XR) headset, a network-connected watch or smartwatch, or other wearable device), a server computer, a vehicle or computing system or device of a vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
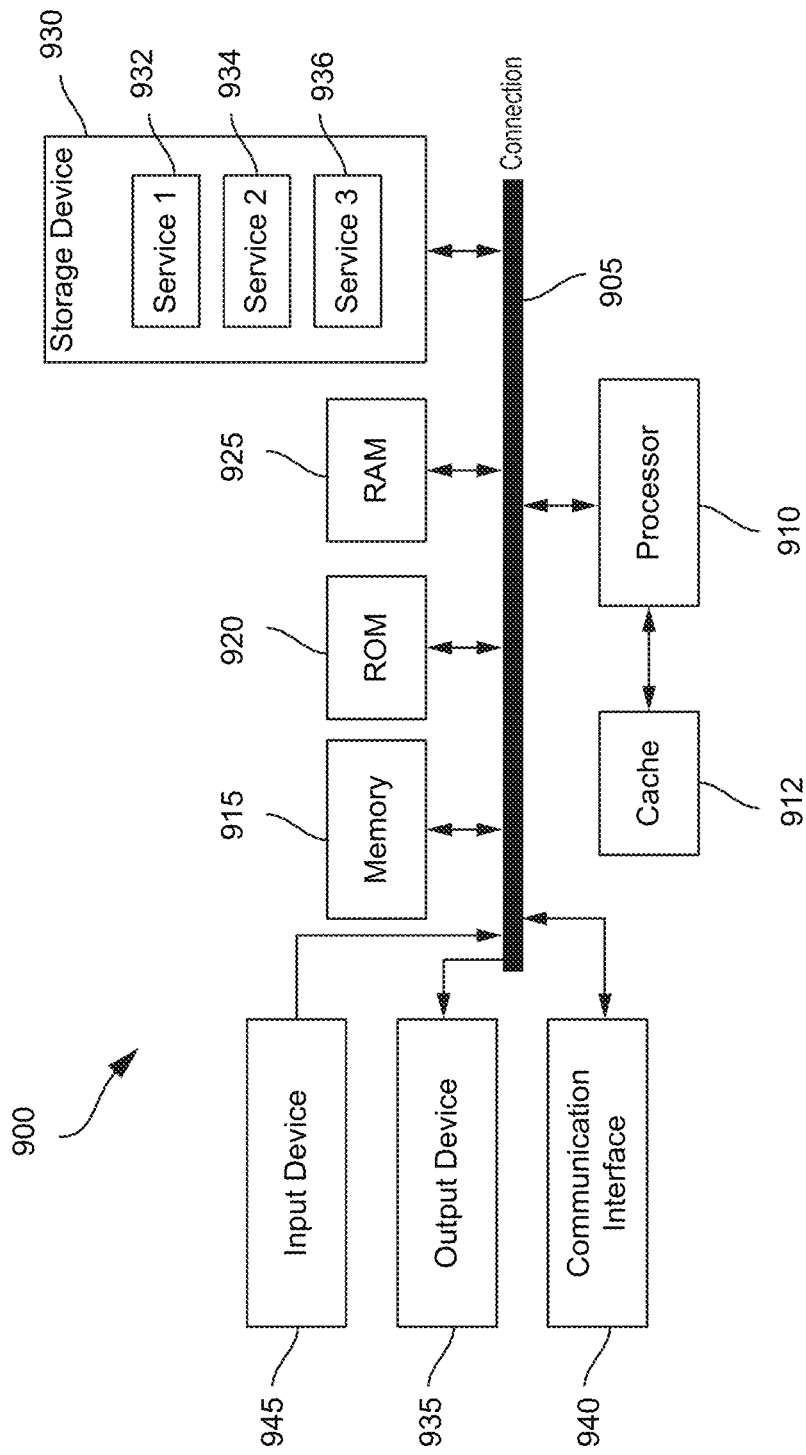
FIG. 9 is a block diagram illustrating an example of a computing system for implementing certain aspects described herein.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, an extended reality (XR) device, or a mixed reality (MR) device), a personal computer, a laptop computer, a video server, a vehicle (or computing system or device of a vehicle), or other device. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random-access memory (RAM) 925, to processor 910.

Computing device architecture 900 can include a cache of high-speed memory connected directly with, in close proximity to, or integrated as part of processor 910 Computing device architecture 900 can copy data from memory 915 and/or the storage device 930 to cache 912 for quick access by processor 910. In this way, the cache can provide a performance boost that avoids processor 910 delays while waiting for data. These and other engines can control or be configured to control processor 910 to perform various actions. Other computing device memory 915 may be available for use as well. Memory 915 can include multiple different types of memory with different performance characteristics. Processor 910 can include any general-purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules or engines are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of ray tracing, the method comprising: obtaining a hierarchical acceleration data structure, the hierarchical acceleration data structure including a plurality of primitives of a scene object; obtaining a respective information value associated with each primitive included in the plurality of primitives; determining a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes; and traversing the hierarchical acceleration data structure using the sort order.

Aspect 2: The method of Aspect 1, wherein each respective information value associated with each primitive includes at least one of a Surface Area Heuristic (SAH) value, an opaqueness value, or a density value.

Aspect 3: The method of any of Aspects 1 to 2, wherein each respective information value associated with each primitive includes at least one of an area value, a distance value between each respective primitive and a camera associated with the scene object, or a level-of-detail (LOD) value.

Aspect 4: The method of any of Aspects 1 to 3, wherein each respective information value associated with each primitive is included as an entry in a render list associated with the scene object.

Aspect 5: The method of any of Aspects 1 to 4, wherein each respective information value associated with each primitive is obtained as an input to a ray tracing Application Programming Interface (API).

Aspect 6: The method of any of Aspects 1 to 5, wherein each respective sorting parameter value determined for each respective node of the two or more nodes comprises a calculated value based on sorting parameter values determined for one or more child nodes associated with each respective node.

Aspect 7: The method of Aspect 6, wherein the calculated value is an average of the respective sorting parameter value determined for the one or more child nodes.

Aspect 8: The method of any of Aspects 6 to 7, wherein the calculated value is determined based on a functional computation specified as an input to a ray tracing Application Programming Interface (API).

Aspect 9: The method of any of Aspects 1 to 8, further comprising: determining a respective sorting parameter value for each respective node of one or more nodes included in a first level of the hierarchical acceleration data structure; and based on the respective sorting parameter value determined for each respective node of the one or more nodes included in the first level, determining a respective sorting parameter value for each respective node of one or more nodes included in a second level of the hierarchical acceleration data structure.

Aspect 10: The method of Aspect 9, wherein the one or more nodes included in the first level are child nodes of the one or more nodes included in the second level.

Aspect 11: The method of any of Aspects 9 to 10, wherein: the one or more nodes included in the first level are leaf nodes of the hierarchical acceleration data structure, each respective leaf node associated with one or more primitives of the plurality of primitives; and a respective sorting parameter value determined for each respective leaf node comprises a calculated value based on at least one information value determined for one or more primitives associated with each respective leaf node.

Aspect 12: The method of any of Aspects 1 to 11, wherein the sort order is a decreasing order based on each respective sorting parameter value associated with each respective node of the two or more nodes.

Aspect 13: The method of any of Aspects 1 to 12, further comprising performing a depth first search (DFS) traversal of the hierarchical acceleration data structure using the sort order, wherein the sort order is determined based on at least one information value associated with each primitive of the plurality of primitives and at least one sorting parameter value associated with each node of a plurality of nodes included in the hierarchical acceleration data structure.

Aspect 14: The method of any of Aspects 1 to 13, wherein the information value comprises an opaqueness value, wherein at least a first value of the opaqueness value is indicative of an opaque primitive and wherein at least a second value of the opaqueness value is indicative of a non-opaque primitive.

Aspect 15: The method of any of Aspects 1 to 14, wherein traversing the hierarchical acceleration data structure comprises traversing from a parent node to a selected child node associated with the parent node, wherein the selected child node is selected based on a sorting parameter value associated with the selected child node.

Aspect 16: The method of Aspect 15, wherein the selected child node is selected from one or more child nodes associated with the parent node and wherein the selected child node is associated with a maximum sorting parameter value or a minimum sorting parameter value of the one or more child nodes.

Aspect 17: The method of any of Aspects 1 to 16, wherein traversing the hierarchical acceleration data structure comprises: generating an updated hierarchical acceleration data structure based on the sort order, wherein a plurality of primitives included in the updated hierarchical acceleration data structure is the same as the plurality of primitives included in the hierarchical acceleration data structure.

Aspect 18: The method of Aspect 17, wherein the updated hierarchical acceleration data structure: includes a plurality of nodes, each respective node in a plurality of nodes included in a respective level of a plurality of levels included in the hierarchical acceleration data structure; and is generated based on sorting one or more nodes included in each respective level of the plurality of levels such that a depth-first search (DFS) traversal of the updated hierarchical acceleration data structure traverses the plurality of nodes in the sort order.

Aspect 19: The method of any of Aspects 1 to 18, further comprising generating ray tracing graphic content based on traversing the hierarchical acceleration data structure using the sort order.

Aspect 20: An apparatus for ray tracing, the apparatus comprising: a memory; and one or more processors coupled to the memory, the one or more processors configured to: obtain a hierarchical acceleration data structure, the hierarchical acceleration data structure including a plurality of primitives of a scene object; obtain a respective information value associated with each primitive included in the plurality of primitives; determine a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes; and traverse the hierarchical acceleration data structure using the sort order.

Aspect 21: The apparatus of Aspect 20, wherein each respective information value associated with each primitive includes at least one of a Surface Area Heuristic (SAH) value, an opaqueness value, or a density value.

Aspect 22: The apparatus of any of Aspects 20 to 21, wherein each respective information value associated with each primitive includes at least one of an area value, a distance value between each respective primitive and a camera associated with the scene object, or a level-of-detail (LOD) value.

Aspect 23: The apparatus of any of Aspects 20 to 22, wherein each respective information value associated with each primitive is obtained as an input to a ray tracing Application Programming Interface (API).

Aspect 24: The apparatus of any of Aspects 20 to 23, wherein each respective sorting parameter value determined for each respective node of the two or more nodes comprises a calculated value based on sorting parameter values determined for one or more child nodes associated with each respective node.

Aspect 25: The apparatus of Aspect 24, wherein the calculated value is an average of the respective sorting parameter value determined for the one or more child nodes or is determined based on a functional computation specified as an input to a ray tracing Application Programming Interface (API).

Aspect 26: The apparatus of any of Aspects 20 to 25, wherein the one or more processors are further configured to: determine a respective sorting parameter value for each respective node of one or more nodes included in a first level of the hierarchical acceleration data structure; and based on the respective sorting parameter value determined for each respective node of the one or more nodes included in the first level, determine a respective sorting parameter value for each respective node of one or more nodes included in a second level of the hierarchical acceleration data structure.

Aspect 27: The apparatus of Aspect 26, wherein: the one or more nodes included in the first level are leaf nodes of the hierarchical acceleration data structure, each respective leaf node associated with one or more primitives of the plurality of primitives; and a respective sorting parameter value determined for each respective leaf node comprises a calculated value based on at least one information value determined for one or more primitives associated with each respective leaf node.

Aspect 28: A non-transitory computer-readable medium having stored thereon instructions that, when executed by one or more processor, cause the one or more processors to: obtain a hierarchical acceleration data structure, the hierarchical acceleration data structure including a plurality of primitives of a scene object; obtain a respective information value associated with each primitive included in the plurality of primitives; determine a sort order for two or more nodes at least in part by sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes; and traverse the hierarchical acceleration data structure using the sort order.

Aspect 29: The non-transitory computer-readable medium of Aspect 28, wherein each respective information value associated with each primitive includes at least one of a Surface Area Heuristic (SAH) value, an opaqueness value, or a density value.

Aspect 30: The non-transitory computer-readable medium of any of Aspects 28 to 29, wherein the one or more processors are further configured to: determine a respective sorting parameter value for each respective node of one or more nodes included in a first level of the hierarchical acceleration data structure; and based on the respective sorting parameter value determined for each respective node of the one or more nodes included in the first level, determine a respective sorting parameter value for each respective node of one or more nodes included in a second level of the hierarchical acceleration data structure.

Aspect 31: An apparatus comprising means for performing any of the operations of Aspects 1 to 30.

Aspect 32: A non-transitory computer-readable storage medium having stored thereon instructions which, when executed by one or more processors, cause the one or more processors to perform any of the operations of Aspects 1 to 30.

What is claimed is:

1. A method of ray tracing, the method comprising:
obtaining a hierarchical acceleration data structure, the hierarchical acceleration data structure including a plurality of primitives of a scene object;
obtaining a respective information value associated with each primitive included in the plurality of primitives;
determining a sort order for two or more nodes associated with sorting the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes;
generating an updated hierarchical acceleration data structure based on the sort order, wherein a plurality of primitives included in the updated hierarchical acceleration data structure is the same as the plurality of primitives included in the hierarchical acceleration data structure; and traversing the updated hierarchical acceleration data structure.

2. The method of claim 1, wherein each respective information value associated with each primitive includes at least one of a Surface Area Heuristic (SAH) value, an opaqueness value, or a density value.

3. The method of claim 1, wherein each respective information value associated with each primitive includes at least one of an area value, a distance value between each respective primitive and a camera associated with the scene object, or a level-of-detail (LOD) value.

4. The method of claim 1, wherein each respective information value associated with each primitive is included as an entry in a render list associated with the scene object.

5. The method of claim 1, wherein each respective information value associated with each primitive is obtained as an input to a ray tracing Application Programming Interface (API).

6. The method of claim 1, wherein each respective sorting parameter value determined for each respective node of the two or more nodes comprises a calculated value based on sorting parameter values determined for one or more child nodes associated with each respective node.

7. The method of claim 6, wherein the calculated value is an average of the respective sorting parameter value determined for the one or more child nodes.

8. The method of claim 6, wherein the calculated value is determined based on a functional computation specified as an input to a ray tracing Application Programming Interface (API).

9. The method of claim 1, further comprising:
determining a respective sorting parameter value for each respective node of one or more nodes included in a first level of the hierarchical acceleration data structure; and
based on the respective sorting parameter value determined for each respective node of the one or more nodes included in the first level, determining a respective sorting parameter value for each respective node of one or more nodes included in a second level of the hierarchical acceleration data structure.

10. The method of claim 9, wherein the one or more nodes included in the first level are child nodes of the one or more nodes included in the second level.

11. The method of claim 9, wherein:
the one or more nodes included in the first level are leaf nodes of the hierarchical acceleration data structure, each respective leaf node associated with one or more primitives of the plurality of primitives; and
a respective sorting parameter value determined for each respective leaf node comprises a calculated value based on at least one information value determined for one or more primitives associated with each respective leaf node.

12. The method of claim 1, wherein the sort order is a decreasing order based on each respective sorting parameter value associated with each respective node of the two or more nodes.

13. The method of claim 1, further comprising performing a depth first search (DFS) traversal of the updated hierarchical acceleration data structure, wherein the sort order is determined based on at least one information value associated with each primitive of the plurality of primitives and at least one sorting parameter value associated with each node of a plurality of nodes included in the hierarchical acceleration data structure.

14. The method of claim 1, wherein the information value comprises an opaqueness value, wherein at least a first value of the opaqueness value is indicative of an opaque primitive and wherein at least a second value of the opaqueness value is indicative of a non-opaque primitive.

15. The method of claim 1, wherein the updated hierarchical acceleration data structure:
is generated based on sorting one or more nodes included in each respective level of the plurality of levels such that a depth-first search (DFS) traversal of the updated hierarchical acceleration data structure traverses the plurality of nodes in the sort order.

16. The method of claim 1, further comprising generating ray tracing graphic content based on traversing the updated hierarchical acceleration data structure.

17. An apparatus for ray tracing, the apparatus comprising:
at least one memory; and
at least one processor coupled to the at least one memory, the at least one processor configured to:
obtain a hierarchical acceleration data structure, the hierarchical acceleration data structure including a plurality of primitives of a scene object;
obtain a respective information value associated with each primitive included in the plurality of primitives;
determine a sort order for two or more nodes associated with a sort of the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes;
generate an updated hierarchical acceleration data structure based on the sort order, wherein a plurality of primitives included in the updated hierarchical acceleration data structure is the same as the plurality of primitives included in the hierarchical acceleration data structure; and
traverse the updated hierarchical acceleration data structure.

18. The apparatus of claim 17, wherein each respective information value associated with each primitive includes at least one of a Surface Area Heuristic (SAH) value, an opaqueness value, or a density value.

19. The apparatus of claim 17, wherein each respective information value associated with each primitive includes at least one of an area value, a distance value between each respective primitive and a camera associated with the scene object, or a level-of-detail (LOD) value.

20. The apparatus of claim 17, wherein each respective information value associated with each primitive is obtained as an input to a ray tracing Application Programming Interface (API).

21. The apparatus of claim 17, wherein each respective sorting parameter value determined for each respective node of the two or more nodes comprises a calculated value based on sorting parameter values determined for one or more child nodes associated with each respective node.

22. The apparatus of claim 21, wherein the calculated value is an average of the respective sorting parameter value determined for the one or more child nodes or is determined based on a functional computation specified as an input to a ray tracing Application Programming Interface (API).

23. The apparatus of claim 17, wherein the at least one processor is further configured to:

determine a respective sorting parameter value for each respective node of one or more nodes included in a first level of the hierarchical acceleration data structure; and based on the respective sorting parameter value determined for each respective node of the one or more nodes included in the first level, determine a respective sorting parameter value for each respective node of one or more nodes included in a second level of the hierarchical acceleration data structure.

24. The apparatus of claim 23, wherein:

the one or more nodes included in the first level are leaf nodes of the hierarchical acceleration data structure, each respective leaf node associated with one or more primitives of the plurality of primitives; and a respective sorting parameter value determined for each respective leaf node comprises a calculated value based on at least one information value determined for one or more primitives associated with each respective leaf node.

25. A non-transitory computer-readable medium having stored thereon instructions that, when executed by one or more processors, cause the one or more processors to:

obtain a hierarchical acceleration data structure, the hierarchical acceleration data structure including a plurality of primitives of a scene object;

obtain a respective information value associated with each primitive included in the plurality of primitives;

determine a sort order for two or more nodes associated with a sort of the two or more nodes included in a same level of the hierarchical acceleration data structure based on a respective sorting parameter value determined for each respective node of the two or more nodes, wherein each respective sorting parameter value is based on at least one information value associated with one or more primitives included in a sub-tree of each respective node of the two or more nodes;

generate an updated hierarchical acceleration data structure based on the sort order, wherein a plurality of primitives included in the updated hierarchical acceleration data structure is the same as the plurality of primitives included in the hierarchical acceleration data structure; and traverse the updated hierarchical acceleration data structure.

26. The non-transitory computer-readable medium of claim 25, wherein each respective information value associated with each primitive includes at least one of a Surface Area Heuristic (SAH) value, an opaqueness value, or a density value.

27. The non-transitory computer-readable medium of claim 25, wherein the one or more processors are further configured to:

determine a respective sorting parameter value for each respective node of one or more nodes included in a first level of the hierarchical acceleration data structure; and based on the respective sorting parameter value determined for each respective node of the one or more nodes included in the first level, determine a respective sorting parameter value for each respective node of one or more nodes included in a second level of the hierarchical acceleration data structure.

* * * * *